(12) United States Patent
Tsingos et al.

(10) Patent No.: US 11,681,490 B2
(45) Date of Patent: *Jun. 20, 2023

(54) BINAURAL RENDERING FOR HEADPHONES USING METADATA PROCESSING

(71) Applicant: Dolby Laboratories Licensing Corporation, San Francisco, CA (US)

(72) Inventors: Nicolas R. Tsingos, San Francisco, CA (US); Rhonda Wilson, San Francisco, CA (US); Sunil Bharitkar, Scotts Valley, CA (US); C. Phillip Brown, Castro Valley, CA (US); Alan J. Seefeldt, Alameda, CA (US); Remi Audfray, San Francisco, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,681

(22) Filed: Mar. 3, 2022

(65) Prior Publication Data

US 2022/0269471 A1 Aug. 25, 2022

Related U.S. Application Data

(63) Continuation of application No. 17/098,268, filed on Nov. 13, 2020, now Pat. No. 11,269,586, which is a
(Continued)

(51) Int. Cl.
*H04S 3/02* (2006.01)
*H04S 5/00* (2006.01)
(Continued)

(52) U.S. Cl.
CPC .............. *G06F 3/162* (2013.01); *G06F 3/165* (2013.01); *H04R 5/04* (2013.01); *H04S 1/007* (2013.01);
(Continued)

(58) Field of Classification Search
CPC ... G10L 19/008; G10L 19/20; G10L 19/0018; H04S 2420/03; H04M 3/56; H04M 3/568; H04N 7/15
(Continued)

(56) References Cited

U.S. PATENT DOCUMENTS 8,315,396 B2 11/2012 Schreiner
8,325,929 B2 12/2012 Koppens
(Continued)

FOREIGN PATENT DOCUMENTS

CN 1720764 1/2006
CN 101491116 7/2009
(Continued)

OTHER PUBLICATIONS

Breebaart, J. et al. "Multi-Channel goes Mobile: MPEG Surround Binaural Rendering", AES International Conference, Audio for Mobile and handheld devices, Sep. 2, 2006, pp. 1-13.
(Continued)

*Primary Examiner* — George C Monikang

(57) ABSTRACT

Embodiments are described for a method of rendering audio for playback through headphones comprising receiving digital audio content, receiving binaural rendering metadata generated by an authoring tool processing the received digital audio content, receiving playback metadata generated by a playback device, and combining the binaural rendering metadata and playback metadata to optimize playback of the digital audio content through the headphones.

3 Claims, 13 Drawing Sheets

Related U.S. Application Data continuation of application No. 16/673,849, filed on Nov. 4, 2019, now Pat. No. 10,838,684, which is a continuation of application No. 16/352,607, filed on Mar. 13, 2019, now Pat. No. 10,503,461, which is a continuation of application No. 15/934,849, filed on Mar. 23, 2018, now Pat. No. 10,255,027, which is a continuation of application No. 15/031,953, filed as application No. PCT/US2014/062705 on Oct. 28, 2014, now Pat. No. 9,933,989.

(60) Provisional application No. 61/898,365, filed on Oct. 31, 2013.

(51) Int. Cl.
*H04S 5/02* (2006.01)
*G06F 3/16* (2006.01)
*H04S 7/00* (2006.01)
*H04R 5/04* (2006.01)
*H04S 1/00* (2006.01)
*G06F 3/04842* (2022.01)

(52) U.S. Cl.
CPC ............ *H04S 7/304* (2013.01); *H04S 7/306* (2013.01); *G06F 3/04842* (2013.01); *H04S 2400/03* (2013.01); *H04S 2400/13* (2013.01); *H04S 2420/01* (2013.01)

(58) Field of Classification Search
USPC ......................................... 381/17–19, 22–23
See application file for complete search history.

(56) References Cited

U.S. PATENT DOCUMENTS

| | | |
|---|---|---|
| 8,363,865 B1 | 1/2013 | Bottum |
| 8,396,575 B2 | 3/2013 | Kraemer |
| 8,509,454 B2 | 8/2013 | Kirkeby |
| 2004/0260682 A1 | 12/2004 | Herley |
| 2007/0160218 A1 | 7/2007 | Jakka |
| 2008/0008342 A1 | 1/2008 | Sauk |
| 2008/0031462 A1 | 2/2008 | Walsh |
| 2008/0192941 A1 | 8/2008 | Oh |
| 2009/0190766 A1 | 7/2009 | Klayman |
| 2009/0198356 A1 | 8/2009 | Goodwin |
| 2009/0222118 A1 | 9/2009 | Oh |
| 2010/0014692 A1 | 1/2010 | Schreiner |
| 2010/0076772 A1 | 3/2010 | Kim |
| 2010/0191537 A1 | 7/2010 | Breebaart |
| 2010/0284549 A1 | 11/2010 | Oh |
| 2012/0057715 A1 | 3/2012 | Johnston |
| 2012/0082319 A1 | 4/2012 | Jot |
| 2012/0099733 A1 | 4/2012 | Wang |
| 2013/0041648 A1 | 2/2013 | Osman |
| 2013/0094667 A1 | 4/2013 | Millington |
| 2014/0270184 A1 | 9/2014 | Beaton |

FOREIGN PATENT DOCUMENTS

| | | |
|---|---|---|
| CN | 101569093 | 10/2009 |
| CN | 101794208 | 8/2010 |
| CN | 102549655 | 7/2012 |
| CN | 102855464 | 1/2013 |
| CN | 102945276 | 2/2013 |
| CN | 103218198 | 7/2013 |
| CN | 103270508 | 8/2013 |
| CN | 103329571 | 9/2013 |
| CN | 103354630 | 10/2013 |
| RS | 1332 | 8/2013 |
| WO | 2007078254 | 7/2007 |
| WO | 2007080212 A1 | 7/2007 |
| WO | 2009111798 | 9/2009 |
| WO | 2011086060 | 7/2011 |
| WO | 2012125855 | 9/2012 |
| WO | 2013006338 | 1/2013 |

OTHER PUBLICATIONS

DTS Headphone:X http://www.dts.com/professionals/sound-technologies/headphonex.aspx.

Faller, C. et al. "Binaural Reproduction of Stereo Signals Using Upmixing and Diffuse Rendering" AES Convention Paper 8541, presented at the 131st Convention, Oct. 20-23, 2011, New York, USA, pp. 1-8.

Harma, A. et al. "Techniques and Applications of Wearable Augmented Reality Audio" AES Convention paper 5768, presented at the 114th Convention, Mar. 22-25, 2003, Amsterdam, The Netherlands, pp. 1-20.

Laitinen, M.V. et al. "Binaural Reproduction for Directional Audio Coding" IEEE Workshop on Applications of Signal Processing to Audio and Acoustics, Oct. 18, 2009, pp. 337-340.

Vaananen, R. et al. "Advanced AudioBIFS: Virtual Acoustics modeling in MPEG—Scene Description" IEEE Transactions on Multimedia, vol. 6, issue 5, pp. 661-675, Oct. 2004.

Merimaa, Juha "Modification of HRTF Filters to Reduce Timbral Effects in Binaural Synthesis" AES Convention Paper 7912, presented at the 127th Convention, Oct. 9-12, 2009, New York, USA, pp. 1-14.

Stanojevic, Tomislav "3-D Sound in Future HDTV Projection Systems," 132nd SMPTE Technical Conference, Jacob K. Javits Convention Center, New York City, New York, Oct. 13-17, 1990, 20 pages.

Stanojevic, Tomislav "Surround Sound for a New Generation of Theaters," Sound and Video Contractor, Dec. 20, 1995, 7 pages.

Stanojevic, Tomislav "Virtual Sound Sources in the Total Surround Sound System," SMPTE Conf. Proc.,1995, pp. 405-421.

Stanojevic, Tomislav et al. "Designing of TSS Halls," 13th International Congress on Acoustics, Yugoslavia, 1989, pp. 326-331.

Stanojevic, Tomislav et al. "Some Technical Possibilities of Using the Total Surround Sound Concept in the Motion Picture Technology," 133rd SMPTE Technical Conference and Equipment Exhibit, Los Angeles Convention Center, Los Angeles, California, Oct. 26-29, 1991, 3 pages.

Stanojevic, Tomislav et al. "The Total Surround Sound (TSS) Processor," SMPTE Journal, Nov. 1994, pp. 734-740.

Stanojevic, Tomislav et al. "The Total Surround Sound System (TSS System)", 86th AES Convention, Hamburg, Germany, Mar. 7-10, 1989, 21 pages.

Stanojevic, Tomislav et al. "TSS Processor" 135th SMPTE Technical Conference, Los Angeles Convention Center, Los Angeles, California, Society of Motion Picture and Television Engineers, Oct. 29-Nov. 2, 1993, 22 pages.

Stanojevic, Tomislav et al. "TSS System and Live Performance Sound" 88th AES Convention, Montreux, Switzerland, Mar. 13-16, 1990, 27 pages.

Thompson, J. et al. "Direct-Diffuse Decomposition of Multichannel Signals Using a System of Pairwise Correlations" 'AES Convention Paper 8807 presented at the 133rd Convention, Oct. 26-29, 2012, San Francisco, CA, USA pp. 1-15.

BINAURAL RENDERING FOR HEADPHONES USING METADATA PROCESSING

CROSS REFERENCE TO RELATED APPLICATIONS

This application is a continuation of U.S. patent application Ser. No. 17/098,268 filed on Nov. 13, 2020, which is a continuation of U.S. patent application Ser. No. 16/673,849 (now U.S. Pat. No. 10,838,684, issued Nov. 17, 2020) filed on Nov. 4, 2019, which in turn is a continuation of U.S. patent application Ser. No. 16/352,607, filed on Mar. 13, 2019 (now U.S. Pat. No. 10,503,461, issued Dec. 10, 2019), which in turn is a continuation of U.S. patent application Ser. No. 15/934,849, filed on Mar. 23, 2018 (now U.S. Pat. No. 10,255,027, issued Apr. 9, 2019), which in turn is a continuation of U.S. patent application Ser. No. 15/031,953, filed on Apr. 25, 2016 (now U.S. Pat. No. 9,933,989, issued Apr. 3, 2018), which is the U.S. national stage of International Patent Application No. PCT/US2014/062705 filed on Oct. 28, 2014, which in turn claims priority to U.S. Provisional Patent Application No. 61/898,365, filed on Oct. 31, 2013, each of which is hereby incorporated by reference in its entirety.

FIELD OF THE INVENTION

One or more implementations relate generally to audio signal processing, and more specifically to binaural rendering of channel and object-based audio for headphone playback.

BACKGROUND

Virtual rendering of spatial audio over a pair of speakers commonly involves the creation of a stereo binaural signal that represents the desired sound arriving at the listener's left and right ears and is synthesized to simulate a particular audio scene in three-dimensional (3D) space, containing possibly a multitude of sources at different locations. For playback through headphones rather than speakers, binaural processing or rendering can be defined as a set of signal processing operations aimed at reproducing the intended 3D location of a sound source over headphones by emulating the natural spatial listening cues of human subjects. Typical core components of a binaural renderer are head-related filtering to reproduce direction dependent cues as well as distance cues processing, which may involve modeling the influence of a real or virtual listening room or environment. One example of a present binaural renderer processes each of the 5 or 7 channels of a 5.1 or 7.1 surround in a channel-based audio presentation to 5/7 virtual sound sources in 2D space around the listener. Binaural rendering is also commonly found in games or gaming audio hardware, in which case the processing can be applied to individual audio objects in the game based on their individual 3D position.

Traditionally, binaural rendering is a form of blind post-processing applied to multichannel or object-based audio content. Some of the processing involved in binaural rendering can have undesirable and negative effects on the timbre of the content, such as smoothing of transients or excessive reverberation added to dialog or some effects and music elements. With the growing importance of headphone listening and the additional flexibility brought by object-based content (such as the Dolby® Atmos™ system), there is greater opportunity and need to have the mixers create and encode specific binaural rendering metadata at content creation time, for instance instructing the renderer to process parts of the content with different algorithms or with different settings. Present systems do not feature this capability, nor do they allow such metadata to be transported as part of an additional specific headphone payload in the codecs.

Current systems are also not optimized at the playback end of the pipeline, insofar as content is not configured to be received on a device with additional metadata that can be provided live to the binaural renderer. While real-time head-tracking has been previously implemented and shown to improve binaural rendering, this generally prevents other features such as automated continuous head-size sensing and room sensing, and other customization features that improve the quality of the binaural rendering to be effectively and efficiently implemented in headphone-based playback systems.

What is needed, therefore, is a binaural renderer running on the playback device that combines authoring metadata with real-time locally generated metadata to provide the best possible experience to the end user when listening to channel and object-based audio through headphones. Furthermore, for channel-based content it is generally required that the artistic intent be retained by incorporating audio segmentation analysis.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF EMBODIMENTS

Embodiments are described for systems and methods of virtual rendering object-based audio content and improved equalization in headphone-based playback systems. Embodiments include a method for rendering audio for playback through headphones comprising receiving digital audio content, receiving binaural rendering metadata generated by an authoring tool, processing the received digital audio content, receiving playback metadata generated by a playback device, and combining the binaural rendering metadata and playback metadata to optimize playback of the digital audio content through the headphones. The digital audio content may comprise channel-based audio and object-based audio including positional information for reproducing an intended location of a corresponding sound source in three-dimensional space relative to a listener. The method further comprises separating the digital audio content into one or more components based on content type, and wherein the content type is selected from the group consisting of: dialog, music, audio effects, transient signals, and ambient signals. The binaural rendering metadata controls a plurality of channel and object characteristics including: position, size, gain adjustment, and content dependent settings or processing presets; and the playback metadata controls a plurality of listener specific characteristics including head position, head orientation, head size, listening room noise levels, listening room properties, and playback device or screen position relative to the listener. The method may further include receiving one or more user input commands modifying the binaural rendering metadata, the user input commands controlling one or more characteristics including: elevation emphasis where elevated objects and channels could receive a gain boost, preferred 1D (one-dimensional) sound radius or 3D scaling factors for object or channel positioning, and processing mode enablement (e.g., to toggle between traditional stereo or full processing of content). The playback metadata may be generated in response to sensor data provided by an enabled headset housing a plurality of sensors, the enabled headset comprising part of the playback device. The method may further comprise separating the input audio into separate sub-signals, e.g. by content type or unmixing the input audio (channel-based and object-based) into constituent direct content and diffuse content, wherein the diffuse content comprises reverberated or reflected sound elements, and performing binaural rendering on the separate sub-signals independently.

Embodiments are also directed to a method for rendering audio for playback through headphones by receiving content dependent metadata dictating how content elements are rendered through the headphones, receiving sensor data from at least one of a playback device coupled to the headphones and an enabled headset including the headphones, and modifying the content dependent metadata with the sensor data to optimize the rendered audio with respect to one or more playback and user characteristics. The content dependent metadata may be generated by an authoring tool operated by a content creator, and wherein the content dependent metadata dictates the rendering of an audio signal containing audio channels and audio objects. The content dependent metadata controls a plurality of channel and object characteristics selected from the group consisting of: position, size, gain adjustment, elevation emphasis, stereo/full toggling, 3D scaling factors, content dependent settings, and other spatial and timbre properties of the rendered sound-field. The method may further comprise formatting the sensor data into a metadata format compatible with the content dependent metadata to produce playback metadata. The playback metadata controls a plurality of listener specific characteristics selected from the group consisting of: head position, head orientation, head size, listening room noise levels, listening room properties, and sound source device position. In an embodiment, the metadata format comprises a container including one or more payload packets conforming to a defined syntax and encoding digital audio definitions for corresponding audio content elements.

The method further comprises encoding the combined playback metadata and the content dependent metadata with source audio content into a bitstream for processing in a rendering system; and decoding the encoded bitstream to extract one or more parameters derived from the content dependent metadata and the playback metadata to generate a control signal modifying the source audio content for playback through the headphones.

The method may further comprise performing one or more post-processing functions on the source audio content prior to playback through headphones; wherein the post-processing functions comprise at least one of: downmixing from a plurality of surround sound channels to one of a binaural mix or a stereo mix, level management, equalization, timbre correction, and noise cancellation.

Embodiments are further directed to systems and articles of manufacture that perform or embody processing commands that perform or implement the above-described method acts.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are described for virtual rendering of object-based content over headphones, and a metadata delivery and processing system for such virtual rendering, though applications are not so limited. Aspects of the one or more embodiments described herein may be implemented in an audio or audio-visual system that processes source audio information in a mixing, rendering and playback system that includes one or more computers or processing devices executing software instructions. Any of the described embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 1:
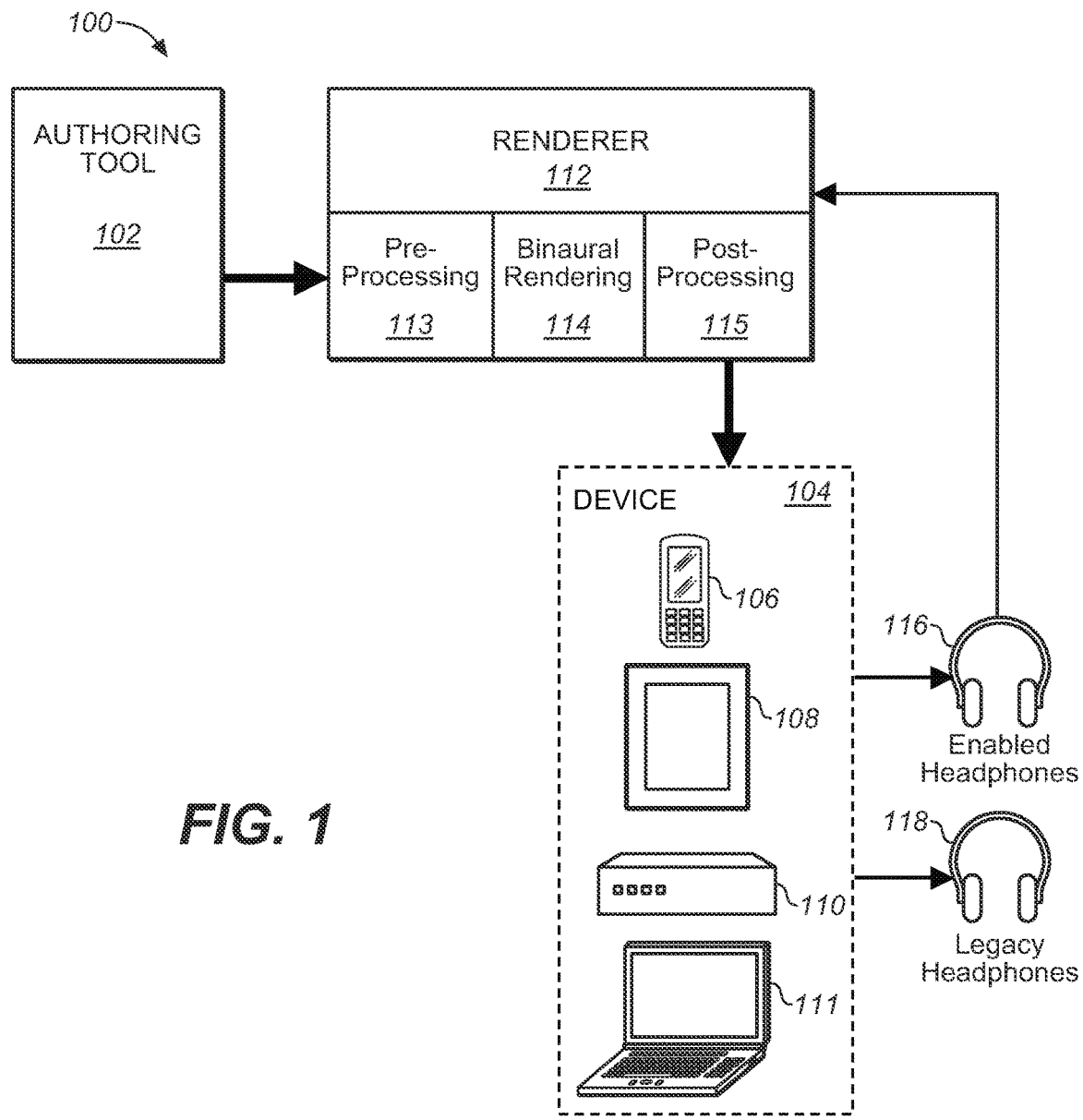
FIG. 1 illustrates an overall system that incorporates embodiments of a content creation, rendering and playback system, under some embodiments.

Embodiments are directed to an audio content production and playback system that optimizes the rendering and playback of object and/or channel-based audio over headphones. FIG. 1 illustrates an overall system that incorporates embodiments of a content creation, rendering and playback system, under some embodiments. As shown in system 100, an authoring tool 102 is used by a creator to generate audio content for playback through one or more devices 104 for a user to listen to through headphones 116 or 118. The device 104 is generally a portable audio or music player or small computer or mobile telecommunication device that runs applications that allow for the playback of audio content. Such a device may be a mobile phone or audio (e.g., MP3) player 106, a tablet computer (e.g., Apple iPad or similar device) 108, music console 110, a notebook computer 111, or any similar audio playback device. The audio may comprise music, dialog, effects, or any digital audio that may be desired to be listened to over headphones, and such audio may be streamed wirelessly from a content source, played back locally from storage media (e.g., disk, flash drive, etc.), or generated locally. In the following description, the term "headphone" usually refers specifically to a close-coupled playback device worn by the user directly over his or her ears or in-ear listening devices; it may also refer generally to at least some of the processing performed to render signals intended for playback on headphones as an alternative to the terms "headphone processing" or "headphone rendering."

In an embodiment, the audio processed by the system may comprise channel-based audio, object-based audio or object and channel-based audio (e.g., hybrid or adaptive audio). The audio comprises or is associated with metadata that dictates how the audio is rendered for playback on specific endpoint devices and listening environments. Channel-based audio generally refers to an audio signal plus metadata in which the position is coded as a channel identifier, where the audio is formatted for playback through a pre-defined set of speaker zones with associated nominal surround-sound locations, e.g., 5.1, 7.1, and so on; and object-based means one or more audio channels with a parametric source description, such as apparent source position (e.g., 3D coordinates), apparent source width, etc. The term "adaptive audio" may be used to mean channel-based and/or object-based audio signals plus metadata that renders the audio signals based on the playback environment using an audio stream plus metadata in which the position is coded as a 3D position in space. In general, the listening environment may be any open, partially enclosed, or fully enclosed area, such as a room, but embodiments described herein are generally directed to playback through headphones or other close proximity endpoint devices. Audio objects can be considered as groups of sound elements that may be perceived to emanate from a particular physical location or locations in the environment, and such objects can be static or dynamic. The audio objects are controlled by metadata, which among other things, details the position of the sound at a given point in time, and upon playback they are rendered according to the positional metadata. In a hybrid audio system, channel-based content (e.g., 'beds') may be processed in addition to audio objects, where beds are effectively channel-based sub-mixes or stems. These can be delivered for final playback (rendering) and can be created in different channel-based configurations such as 5.1, 7.1.

As shown in FIG. 1, the headphone utilized by the user may be a legacy or passive headphone 118 that only includes non-powered transducers that simply recreate the audio signal, or it may be an enabled headphone 118 that includes sensors and other components (powered or non-powered) that provide certain operational parameters back to the renderer for further processing and optimization of the audio content. Headphones 116 or 118 may be embodied in any appropriate close-ear device, such as open or closed headphones, over-ear or in-ear headphones, earbuds, earpads, noise-cancelling, isolation, or other type of headphone device. Such headphones may be wired or wireless with regard to its connection to the sound source or device 104.

In an embodiment, the audio content from authoring tool 102 includes stereo or channel based audio (e.g., 5.1 or 7.1 surround sound) in addition to object-based audio. For the embodiment of FIG. 1, a renderer 112 receives the audio content from the authoring tool and provides certain functions that optimize the audio content for playback through device 104 and headphones 116 or 118. In an embodiment, the renderer 112 includes a pre-processing stage 113, a binaural rendering stage 114, and a post-processing stage 115. The pre-processing stage 113 generally performs certain segmentation operations on the input audio, such as segmenting the audio based on its content type, among other functions; the binaural rendering stage 114 generally combines and processes the metadata associated with the channel and object components of the audio and generates a binaural stereo or multi-channel audio output with binaural stereo and additional low frequency outputs; and the post-processing component 115 generally performs downmixing, equalization, gain/loudness/dynamic range control, and other functions prior to transmission of the audio signal to the device 104. It should be noted that while the renderer will likely generate two-channel signals in most cases, it could be configured to provide more than two channels of input to specific enabled headphones, for instance to deliver separate bass channels (similar to LFE 0.1 channel in traditional surround sound). The enabled headphone may have specific sets of drivers to reproduce bass components separately from the mid to higher frequency sound.

It should be noted that the components of FIG. 1 generally represent the main functional blocks of the audio generation, rendering, and playback systems, and that certain functions may be incorporated as part of one or more other components. For example, one or more portions of the renderer 112 may be incorporated in part or in whole in the device 104. In this case, the audio player or tablet (or other device) may include a renderer component integrated within the device. Similarly, the enabled headphone 116 may include at least some functions associated with the playback device and/or renderer. In such a case, a fully integrated headphone may include an integrated playback device (e.g., built-in content decoder, e.g. MP3 player) as well as an integrated rendering component. Additionally, one or more components of the renderer 112, such as the pre-processing component 113 may be implemented at least in part in the authoring tool, or as part of a separate pre-processing component.

Figure 2A:
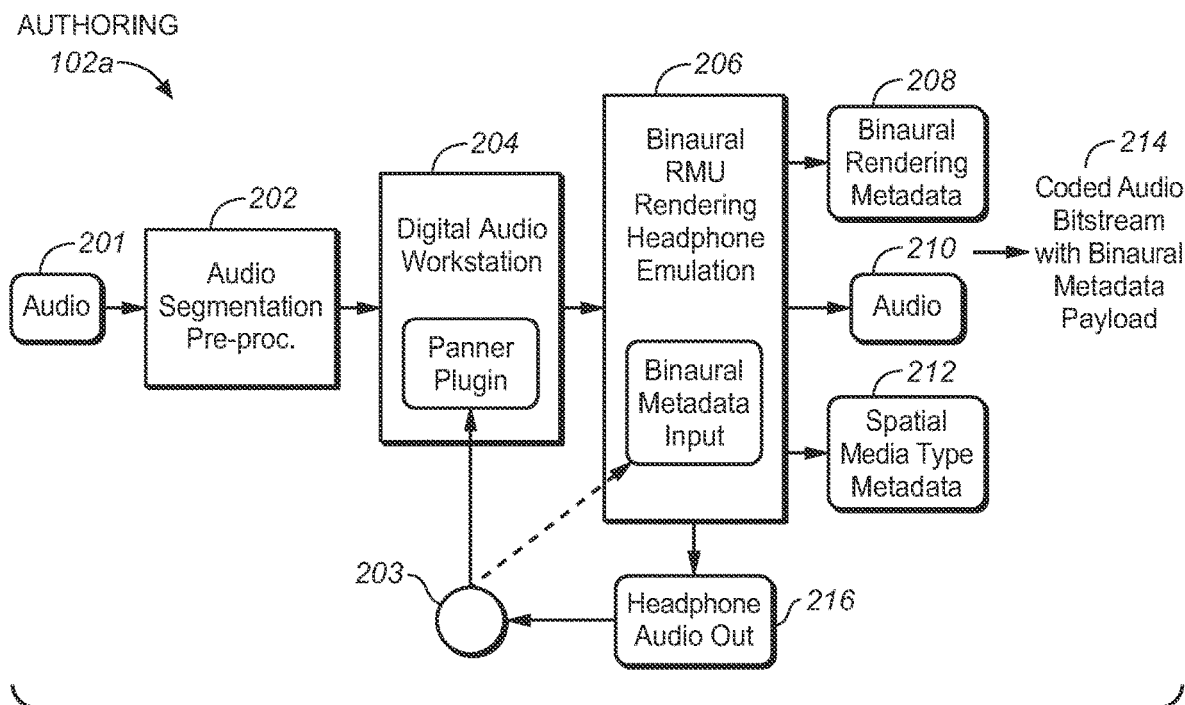
FIG. 2A is a block diagram of an authoring tool used in an object-based headphone rendering system, under an embodiment.

FIG. 2A is a block diagram of an authoring tool used in an object-based headphone rendering system, under an embodiment. As shown in FIG. 2A, input audio 202 from an audio source (e.g., live source, recording, etc.) is input to a digital audio workstation (DAW) 204 for processing by a sound engineer. The input audio 201 is typically in digital form, and if analog audio is used, an A/D (analog-to-digital) conversion step (not shown) is required. This audio typically comprises object and channel-based content, such as may be used in an adaptive audio system (e.g., Dolby Atmos), and often includes several different types of content. The input audio may be segmented through an (optional) audio segmentation pre-process, 204 that separates (or segments) the audio based on its content type so that different types of audio may be rendered differently. For example, dialog may be rendered differently than transient signals or ambient signals. The DAW 204 may be implemented as a workstation for editing and processing the segmented or unsegmented digital audio 202, and may include a mixing console, control surface, audio converter, data storage and other appropriate elements. In an embodiment, DAW is a processing platform that runs digital audio software that provides comprehensive editing functionality as well as an interface for one or more plug-in programs, such as a panner plug-in, among other functions, such as equalizers, synthesizers, effects, and so on. The panner plug-in shown in DAW 204 performs a panning function configured to distribute each object signal to specific speaker pairs or locations in 2D/3D space in a manner that conveys the desired position of each respective object signal to the listener.

In authoring tool 102a, the processed audio from DAW 204 is input to a binaural rendering component 206. This component includes an audio processing function that produces binaural audio output 210 as well as binaural rendering metadata 208 and spatial media type metadata 212. The audio 210 and metadata components 208 and 212 form a coded audio bitstream with binaural metadata payload 214. In general, the audio component 210 comprises channel and object-based audio that is passed to the bitstream 214 with the metadata components 208 and 212; however, it should be noted that the audio component 210 may be standard multi-channel audio, binaurally rendered audio, or a combination of these two audio types. A binaural rendering component 206 also includes a binaural metadata input function that directly produces a headphone output 216 for direct connection to the headphones. For the embodiment of FIG. 2A, the metadata for binaural rendering is generated at mixing time within the authoring tool 102a. In an alternative embodiment, the metadata may be generated at encoding time, as shown with reference to FIG. 2B. As shown in FIG. 2A, a mixer 203 uses an application or tool to create audio data and the binaural and spatial metadata. The mixer 203 provides inputs to the DAW 204. Alternatively, it may also provide inputs directly to the binaural rendering process 206. In an embodiment, the mixer receives the headphone audio output 216 so that the mixer may monitor the effect of the audio and metadata input. This effectively constitutes a feedback loop in which the mixer receives the headphone rendered audio output through headphones to determine if any input changes are needed. The mixer 203 may be a person operating equipment, such as a mixing console or computer, or it may be an automated process that is remotely controlled or pre-programmed.

Figure 2B:
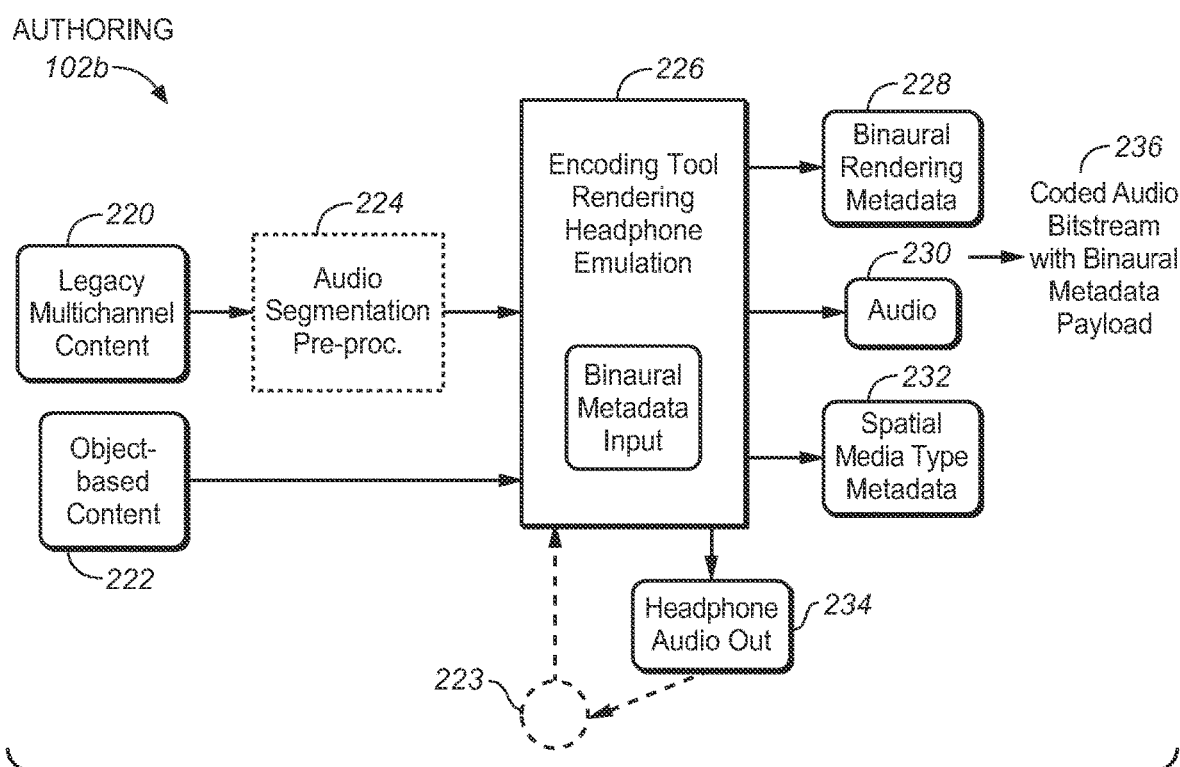
FIG. 2B is a block diagram of an authoring tool used in an object-based headphone rendering system, under an alternative embodiment

FIG. 2B is a block diagram of an authoring tool used in an object-based headphone rendering system, under an alternative embodiment. In this embodiment, the metadata for binaural rendering is generated at encoding time, and the encoder runs a content classifier and metadata generator to generate additional metadata from legacy channel-based content. For the authoring tool 102b of FIG. 2B, legacy multichannel content 220, which does not include any audio objects, but channel-based audio only is input to an encoding tool and rendering headphone emulation component 226. The object-based content 222 is separately input to this component as well. The channel-based legacy content 220 may first be input to an optional audio segmentation pre-processor 224 for separation of different content types for individual rendering. In authoring tool 102b, the binaural rendering component 226 includes a headphone emulation function that produces binaural audio output 230 as well as binaural rendering metadata 228 and spatial media type metadata 232. The audio 230 and metadata components 228 and 232 form a coded audio bitstream with binaural metadata payload 236. As stated above, the audio component 230 usually comprises channel and object-based audio that is passed to the bitstream 236 with the metadata components 228 and 232; however, it should be noted that the audio component 230 may be standard multi-channel audio, binaurally rendered audio, or a combination of these two audio types. When legacy content is input, the output coded audio bitstream could contain explicitly separated sub-components audio data or metadata implicitly describing content type allowing the receiving endpoint to perform segmentation and process each sub-component appropriately. The binaural rendering component 226 also includes a binaural metadata input function that directly produces a headphone output 234 for direct connection to the headphones. As shown in FIG. 2B, an optional mixer (person or process) 223 may be included to monitor the headphone output 234 to input and modify audio data and metadata inputs that may be provided directly to the rendering process 226.

With regard to content type and the operation of the content classifier, audio is generally classified into one of a number of defined content types, such as dialog, music, ambience, special effects, and so on. An object may change content type throughout its duration, but at any specific point in time it is generally only one type of content. In an embodiment, the content type is expressed as a probability that the object is a particular type of content at any point in time. Thus, for example, a constant dialog object would be expressed as a one-hundred percent probability dialog object, while an object that transforms from dialog to music may be expressed as fifty percent dialog/fifty percent music. Processing objects that have different content types could be performed by averaging their respective probabilities for each content type, selecting the content type probabilities for the most dominant object within a group of objects, or a single object over time, or some other logical combination of content type measures. The content type may also be expressed as an n-dimensional vector (where n is the total number of different content types, e.g., four, in the case of dialog/music/ambience/effects). The content type metadata may be embodied as a combined content type metadata definition, where a combination of content types reflects the probability distributions that are combined (e.g., a vector of probabilities of music, speech, and so on).

With regard to classification of audio, in an embodiment, the process operates on a per time-frame basis to analyze the signal, identify features of the signal and compare the identified features to features of known classes in order to determine how well the features of the object match the features of a particular class. Based on how well the features match a particular class, the classifier can identify a probability of an object belonging to a particular class. For example, if at time t=T the features of an object match very well with dialog features, then the object would be classified as dialog with a high probability. If, at time=T+N, the features of an object match very well with music features, the object would be classified as music with a high probability. Finally, if at time T=T+2N the features of an object do not match particularly well with either dialog or music, the object might be classified as 50% music and 50% dialog. Thus, in an embodiment, based on the content type probabilities, audio content can be separated into different sub-signals corresponding to the different content types. This is accomplished, for example, by sending some percentage of the original signal to each sub-signal (either on a wide-band basis or on a per frequency sub-band basis), in a proportion driven by the computed media type probabilities.

Figure 3A:
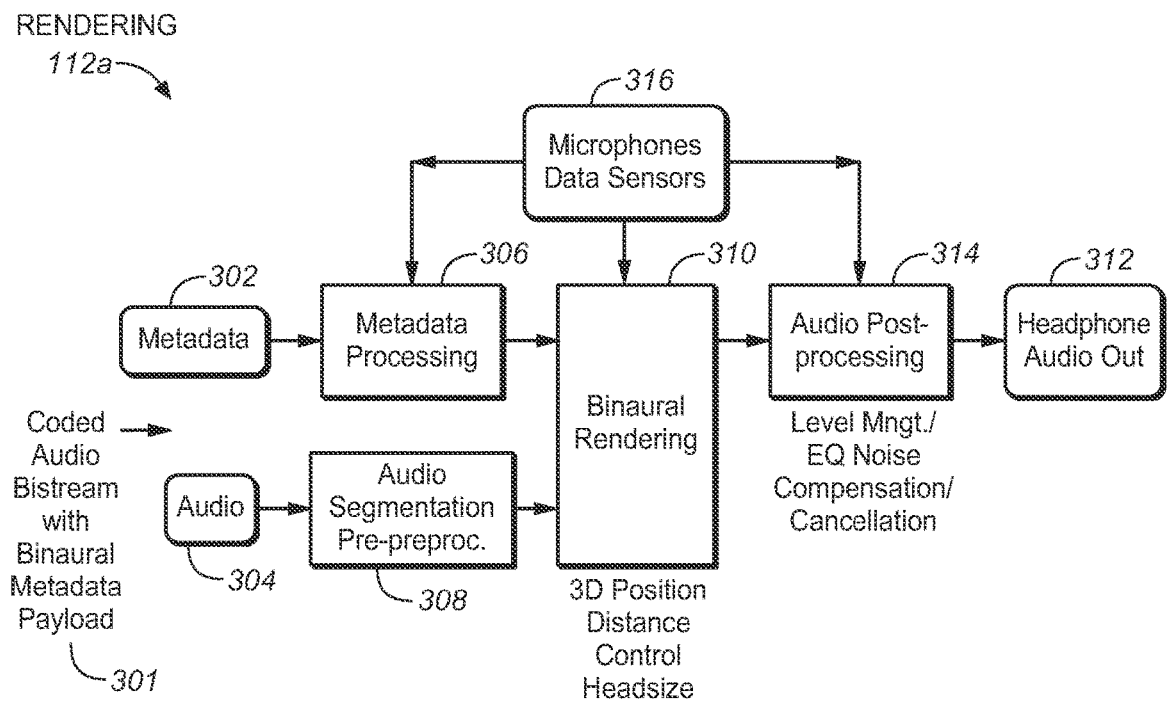
FIG. 3A is a block diagram of a rendering component used in an object-based headphone rendering system, under an embodiment.

With reference to FIG. 1, the output from authoring tool 102 is input to renderer 112 for rendering as audio output for playback through headphones or other endpoint devices. FIG. 3A is a block diagram of a rendering component 112a used in an object-based headphone rendering system, under an embodiment. FIG. 3A illustrates the pre-processing 113, binaural rendering 114, and post-processing 115 sub-components of renderer 112 in greater detail. From the authoring tool 102, the metadata and audio are input into processing or pre-processing components in the form of a coded audio bitstream 301. The metadata 302 is input to a metadata processing component 306, and the audio 304 is input to an optional audio segmentation pro-processor 308. As shown with reference to FIGS. 2A and 2B, audio segmentation may be performed by the authoring tool through pre-processors 202 or 224. If such audio segmentation is not performed by the authoring tool, the renderer may perform this task through pre-processor 308. The processed metadata and segmented audio is then input to a binaural rendering component 310. This component performs certain headphone specific rendering functions, such as 3D positioning, distance control, head size processing, and so on. The binaural rendered audio is then input to audio post-processor 314, which applies certain audio operations, such as level management, equalization, noise compensation or cancellation, and so on. The post-processed audio is then output 312 for playback through headphones 116 or 118. For an embodiment in which the headphones or playback device 104 are fitted with sensors and/or microphones for feedback to the renderer, the microphone and sensor data 316 is input back to at least one of the metadata processing component 306, the binaural rendering component 310 or the audio post-processing component 314. For standard headphones that are not fitted with sensors, headtracking could be replaced by a simpler pseudo-randomly generated head 'jitter' that mimics continuously changing small head movements. This allows any relevant environmental or operational data at the point of playback to be used by the rendering system to further modify the audio to counteract or enhance certain playback conditions.

Figure 3B:
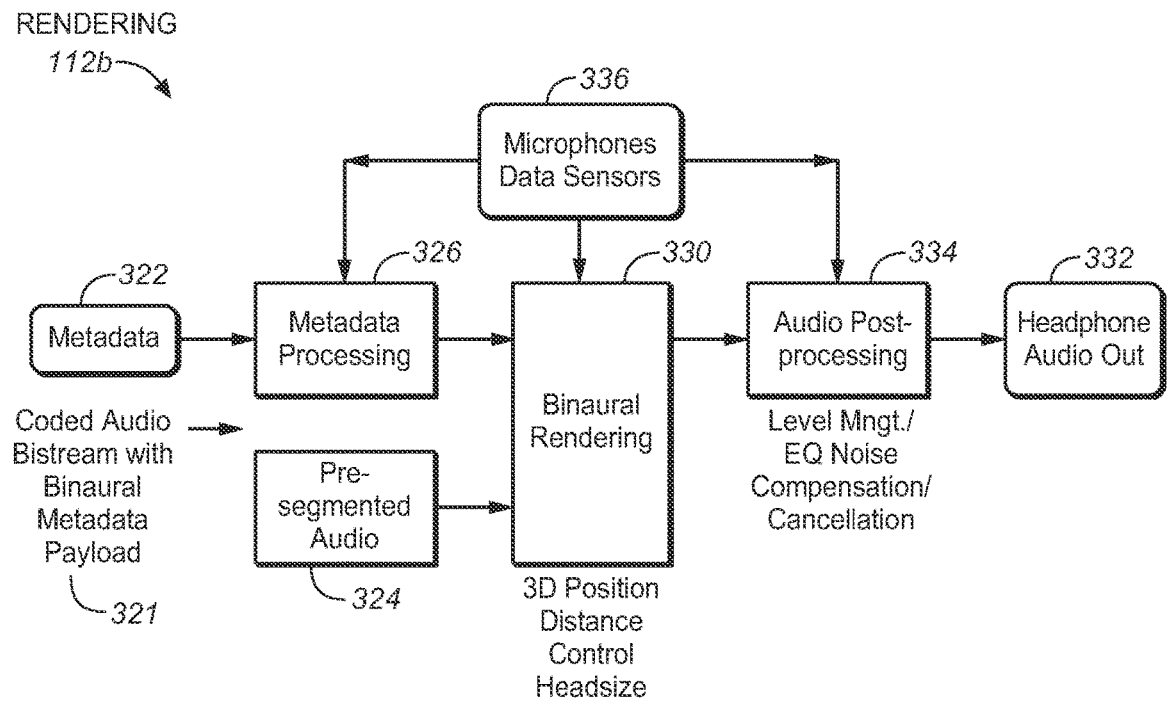
FIG. 3B is a block diagram of a rendering component used in an object-based headphone rendering system, under an alternative embodiment.
Figure 5:
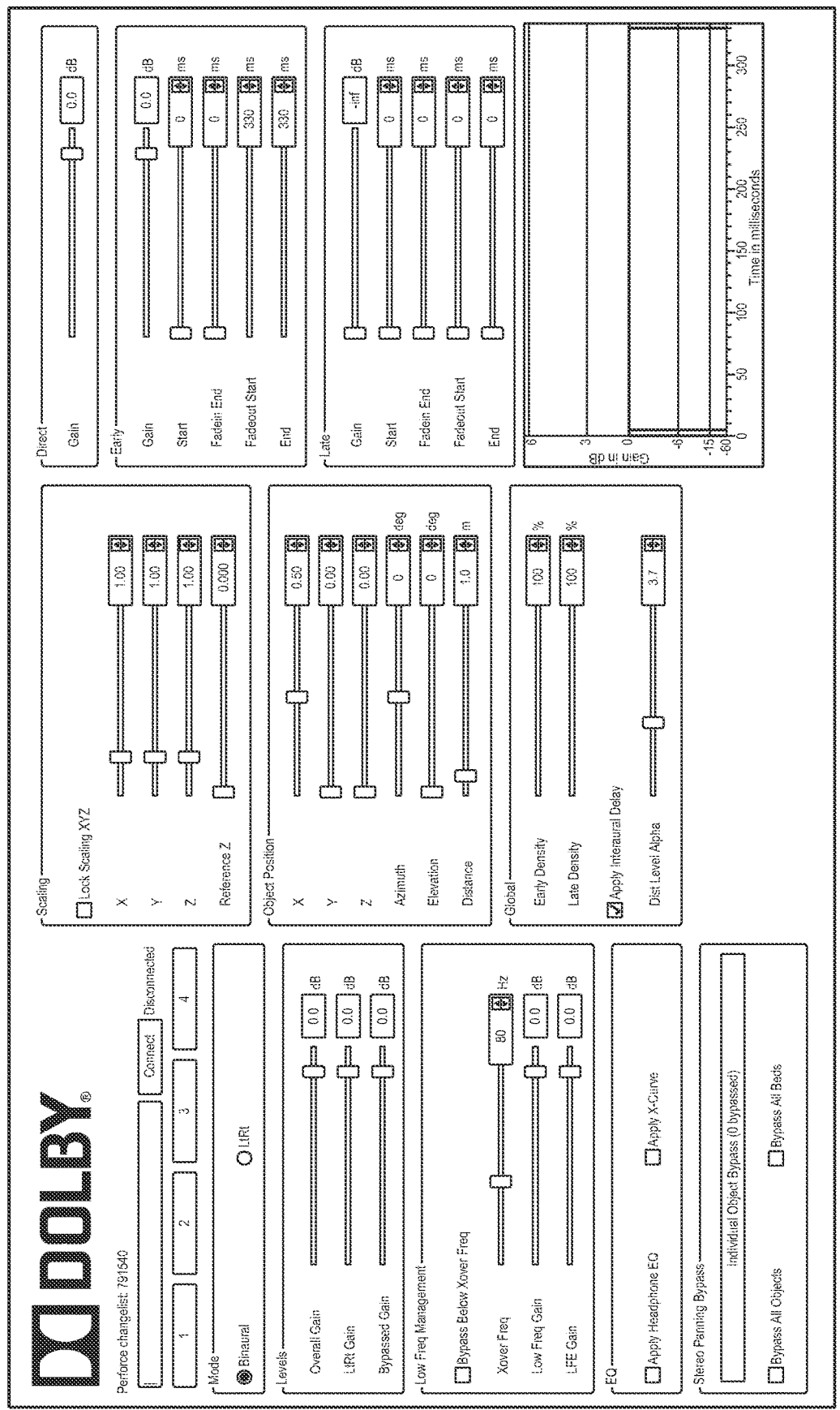
FIG. 5 illustrates an authoring tool GUI that may be used with embodiments of a headphone rendering system, under an embodiment.

As mentioned above, segmentation of the audio may be performed by the authoring tool or the renderer. For the embodiment in which the audio is pre-segmented, the renderer processes this audio directly. FIG. 3B is a block diagram of a rendering component used in an object-based headphone rendering system, under this alternative embodiment. As shown for renderer 112b, coded audio bitstream 321 from the authoring tool is provided in its constituent parts of metadata 322 input to metadata processing component 326, and audio 324 to binaural rendering component 330. For the embodiment of FIG. 3B, the audio is pre-segmented by an audio pre-segmentation process 202 or 224 in the appropriate authoring tool. The binaural rendering component 330 performs certain headphone specific rendering functions, such as 3D positioning, distance control, head size processing, and so on. The binaural rendered audio is then input to audio post-processor 334, which applies certain audio operations, such as level management, equalization, noise compensation or cancellation, and so on. The post-processed audio is then output 332 for playback through headphones 116 or 118. For an embodiment in which the headphones or playback device 104 are fitted with sensors and/or microphones for feedback to the renderer, the microphone and sensor data 336 is input back to at least one of the metadata processing component 326, the binaural rendering component 330 or the audio post-processing component 334. The authoring and rendering systems of FIGS. 2A, 2B, 3A and 3B allow content authors to create and encode specific binaural rendering metadata at content creation time using authoring tool 102. This allows the audio data to be used to instruct the renderer to process parts of the audio content with different algorithms or with different settings. In an embodiment, authoring tool 102 represents a workstation or computer application that allows a content creator (author) to select or create audio content for playback and define certain characteristics for each of the channels and/or objects that make up the audio content. The authoring tool may include a mixer type console interface or a graphical user interface (GUI) representation of a mixing console. FIG. 5 illustrates an authoring tool GUI that may be used with embodiments of a headphone rendering system, under an embodiment. As can be seen in GUI display 500, a number of different characteristics are allowed to be set by the author such as gain levels, low frequency characteristics, equalization, panning, object position and density, delays, fades, and so on. For the embodiment shown, user input is facilitated by the use of virtual sliders for the author to specify setting values, though other virtualized or direct input means are also possible, such as direct text entry, potentiometer settings, rotary dials, and so on. At least some of the parameter settings entered by the user are encoded as metadata that is associated with the relevant channels or audio objects for transport with the audio content. In an embodiment, the metadata may be packaged as part of an additional specific headphone payload in the codec (coder/decoder) circuits in the audio system. Using enabled devices, real-time metadata that encodes certain operational and environmental conditions (e.g., head tracking, head-size sensing, room sensing, ambient conditions, noise levels, etc.) can be provided live to the binaural renderer. The binaural renderer combines the authored metadata content and the real-time locally generated metadata to provide an optimized listening experience for the user. In general, the object controls provided by the authoring tools and user input interfaces allow the user to control certain important headphone-specific parameters, such as binaural and stereo-bypass dynamic rendering modes, LFE (low-frequency element) gain and object gains, media intelligence and content-dependent controls. More specifically, rendering mode could be selected on a content-type basis or object basis between stereo (Lo/Ro), matrixed stereo (Lt/Rt), using a combination of interaural time delays and stereo amplitude or intensity panning, or full binaural rendering (i.e. combination of interaural time delays and levels as well as frequency dependent spectral cues). In addition, a frequency cross over point can be specified to revert to stereo processing below a given frequency. Low frequency gains can also be specified to attenuate low frequency components or LFE content. Low frequency content could also be transported separately to enabled headphones, as described in greater detail below. Other metadata can be specified on a per-content type or per-channel/object basis such as room model generally described by a direct/reverberant gain and a frequency dependent reverberation time and interaural target cross-correlation. It could also include other more detailed modeling of the room (e.g., early reflections positions, gains and late reverberation gain). It could also include directly specified filters modeling a particular room response. Other metadata includes warp to screen flags (that controls how objects are remapped to fit screen aspect ratio and viewing angle as function of distance). Finally a listener relative flag (i.e., to apply headtracking information or not), preferred scaling (specify a default size/aspect ratio of 'virtual room' for rendering the content used to scale the object positions as well as remap to screen (as a function of device screen size and distance to device)) as well as distance model exponent that controls distance attenuation law (e.g., $1/(1+r^\alpha)$) are also possible It is also possible to signal parameter groups or 'presets' that can be applied to different channels/objects or depending on content-type.

As shown with respect to the pre-segmentation components of the authoring tool and/or renderer, different types of content (e.g., dialog, music, effects, etc.) may be processed differently based on the intent of the author and the optimum rendering configuration. Separation of content based on type or other salient characteristic can be achieved a priori during authoring, e.g. by manually keeping dialog separated in their own set of tracks or objects, or a posteriori live prior to rendering in the receiving device. Additional media intelligence tools can be used during authoring to classify content according to different characteristics and generate additional channels or objects that may carry different sets of rendering metadata. For example, having knowledge of the stems (music, dialog, Foley, effects, etc.) and an associated surround (e.g., 5.1) mix, media classifiers could be trained for the content creation process to develop a model to identify different stem mix proportions. An associated source separation technique could be employed to extract the approximate stems using weighting functions derived from the media classifier. From the extracted stems, binaural parameters that would be encoded as metadata may be applied during authoring. In an embodiment, a mirrored process is applied in the end-user device whereby using the decoded metadata parameters would create a substantially similar experience as during content creation.

In an embodiment, extensions to existing studio authoring tools include binaural monitoring and metadata recording. Typical metadata captured at authoring time include: channel/object position/size information for each channel and audio object, channel/object gain adjustment, content dependent metadata (can vary based on content type), bypass flags to indicate settings, such as stereo/left/right rendering should be used instead of binaural, crossover points and levels indicating that bass frequency below cross over point must be bypassed and/or attenuated, and room model information to describe a direct/reverberant gain and a frequency dependent reverberation time or other characteristics, such as early reflections and late reverberation gain. Other content dependent metadata could provide warp to screen functionality that remaps images to fit screen aspect ratio or change the viewing angle as a function of distance. Head tracking information can be applied to provide a listener relative experience. Metadata could also be used that implements a distance model exponent that controls distance as a function of attenuation law (e.g., $1/(1+r^\alpha)$). These represent only certain characteristics that may be encoded by the metadata, and other characteristics may also be encoded.

Figure 4:
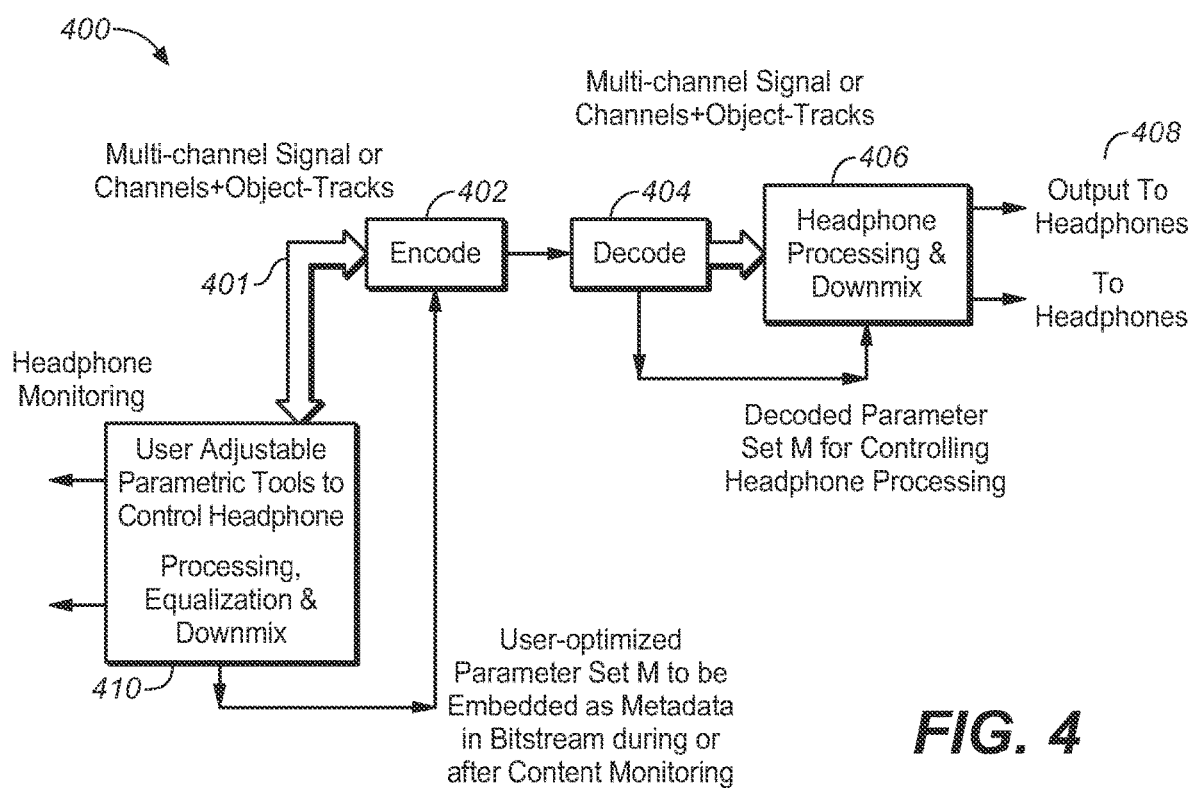
FIG. 4 is a block diagram that provides an overview of the dual-ended binaural rendering system, under an embodiment.

FIG. 4 is a block diagram that provides an overview of the dual-ended binaural rendering system, under an embodiment. In an embodiment, system 400 provides content-dependent metadata and rendering settings that affect how different types of audio content are to be rendered. For example, the original audio content may comprise different audio elements, such as dialog, music, effects, ambient sounds, transients, and so on. Each of these elements may be optimally rendered in different ways, instead of limiting them to be rendered all in only one way. For the embodiment of system 400, audio input 401 comprises a multi-channel signal, object-based channel or hybrid audio of channel plus objects. The audio is input to an encoder 402 that adds or modifies metadata associated with the audio objects and channels. As shown in system 400, the audio is input to a headphone monitoring component 410 that applies user adjustable parametric tools to control headphone processing, equalization, downmix, and other characteristics appropriate for headphone playback. The user-optimized parameter set (M) is then embedded as metadata or additional metadata by the encoder 402 to form a bitstream that is transmitted to decoder 404. The decoder 404 decodes the metadata and the parameter set M of the object and channel-based audio for controlling the headphone processing and downmix component 406, which produces headphone optimized and downmixed (e.g., 5.1 to stereo) audio output 408 to the headphones. Although certain content dependent processing has been implemented in present systems and post-processing chains, it has generally not been applied to binaural rendering, such as illustrated in system 400 of FIG. 4.

As shown in FIG. 4, certain metadata may be provided by a headphone monitoring component 410 that provides specific user adjustable parametric tools to control headphone-specific playback. Such a component may be configured to provide a user some degree of control over headphone rendering for legacy headphones 118 that passively playback transmitted audio content. Alternatively, the endpoint device may be an enabled headphone 116 that includes sensors and/or some degree of processing capability to generate metadata or signal data that can be encoded as compatible metadata to further modify the authored metadata to optimize the audio content for rendering over headphones. Thus, at the receiving end of the content, rendering is performed live and can account for locally generated sensor array data which can be generated either by a headset or an actual mobile device 104 to which headsets are attached, and such hardware-generated metadata can be further combined with the metadata created by the content creator at authoring time to enhance the binaural rendering experience.

As stated above, in some embodiments, low frequency content may be transported separately to enabled headphones allowing more than stereo input (typically 3 or 4 audio inputs), or encoded and modulated into the higher frequencies of the main stereo waveforms carried to a headset with only stereo input. This would allow further low frequency processing to occur in the headphones (e.g. routing to specific drivers optimized for low frequencies). Such headphones may include low frequency specific drivers and/or filter plus crossover and amplification circuitry to optimize playback of low frequency signals.

In an embodiment, a link from the headphones to the headphone processing component is provided on the playback side to enable manual identification of the headphones for automatic headphone preset loading or other configuration of the headphones. Such a link may be implemented as a wireless or wired link from the headphones to headphone process 406 in FIG. 4, for example. The identification may be used to configure the target headphones or to send specific content or specifically rendered content to a specific set of headphones if multiple target headphones are being used. The headphone identifier may be embodied in any appropriate alphanumeric or binary code that is processed by the rendering process as either part of the metadata or a separate data processing operation.

Figure 6:
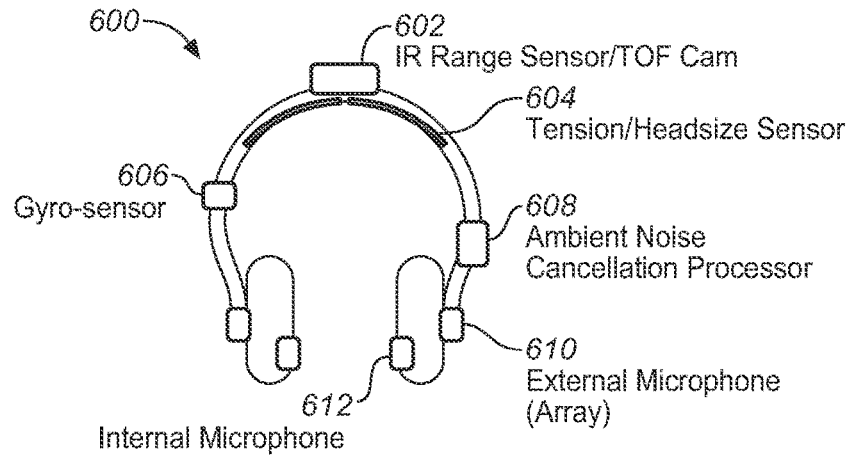
FIG. 6 illustrates an enabled headphone that comprises one or more sensors that sense playback conditions for encoding as metadata used in a headphone rendering system, under an embodiment.

FIG. 6 illustrates an enabled headphone that comprises one or more sensors that sense playback conditions for encoding as metadata used in a headphone rendering system, under an embodiment. The various sensors may be arranged in a sensor array that can be used to provide live metadata to the renderer at render time. For the example headphone 600 of FIG. 6, the sensors include a range sensor (such as infrared IR or time-of-flight TOF camera) 602, tension/headsize sensor 604, gyroscopic sensor 606, external microphone (or pair) 610, ambient noise cancellation processor 608, internal microphone (or pair) 612, among other appropriate sensors. As shown in FIG. 6, the sensor array can comprise both audio sensors (i.e., microphones) as well as data sensors (e.g., orientation, size, tension/stress, and range sensors). Specifically for use with headphones, orientation data can be used to 'lock' or rotate the spatial audio object according to the listener's head motion, tension sensors or external microphones can be used to infer the size of the listener's head (e.g., by monitoring audio cross correlation at two external microphones located on the earcups) and adjust relevant binaural rendering parameters (e.g., interaural time delays, shoulder reflection timing, etc.). Range sensors 602 can be used to evaluate distance to the display in case of a mobile A/V playback and correct the location of on-screen objects to account for the distance-dependent viewing angle (i.e. render objects wider as the screen is brought closer to the listener) or adjust global gain and room model to convey appropriate distance rendering. Such a sensor function is useful if the audio content is part of A/V content that is played back on devices that may range from small mobile phones (e.g., 2-4" screen size) to tablets (e.g., 7-10" screen size) to laptop computers (e.g., 15-17" screen size). In addition sensors can also be used to automatically detect and set the routing of the left and right audio outputs to the correct transducers, not requiring a specific a priori orientation or explicit "Left/Right" markings on the headphones.

As shown in FIG. 1, the audio or A/V content transmitted to the headphones 116 or 118 may be provided through a handheld or portable device 104. In an embodiment, the device 104 itself may include one or more sensors. For example, if the device is a handheld game console or game controller, certain gyro sensors and accelerometers may be provided to track object movement and position. For this embodiment, the device 104 to which the headset is connected can also provide additional sensor data such as orientation, head size, camera, etc., as device metadata.

Figure 7:
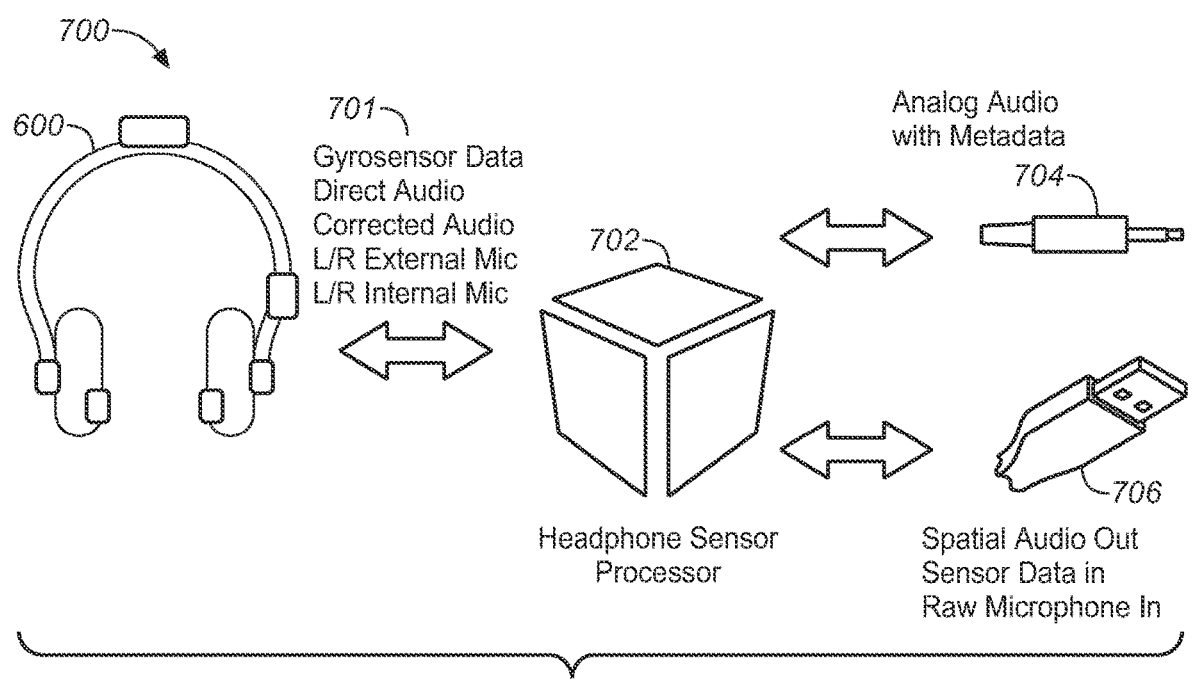
FIG. 7 illustrates the connection between a headphone and device including a headphone sensor processor, under an embodiment.

For this embodiment, certain headphone-to-device communication means are implemented. For example, the headset can be connected to the device either through a wired or wireless digital link or an analog audio link (microphone input), in which case the metadata will be frequency modulated and added to the analog microphone input. FIG. 7 illustrates the connection between a headphone and device 104 including a headphone sensor processor 702, under an embodiment. As shown in system 700, headphone 600 transmits certain sensor, audio and microphone data 701 over a wired or wireless link to headphone sensor processor 702. The processed data from processor 702 may comprise analog audio with metadata 704 or spatial audio output 706. As shown in FIG. 7, each of the connections comprises a bi-directional link between the headphone, processor, and outputs. This allows sensor and microphone data to be transmitted to and from the headphones and device for creation or modification of appropriate metadata. In addition to hardware generated metadata, user controls can also be provided to complement or generate appropriate metadata if not available through hardware sensor arrays. Example user controls can include: elevation emphasis, binaural on/off switch, preferred sound radius or size, and other similar characteristics. Such user controls may be provided through hardware or software interface elements associated with the headphone processor component, playback device, and/or headphones.

Figure 8:
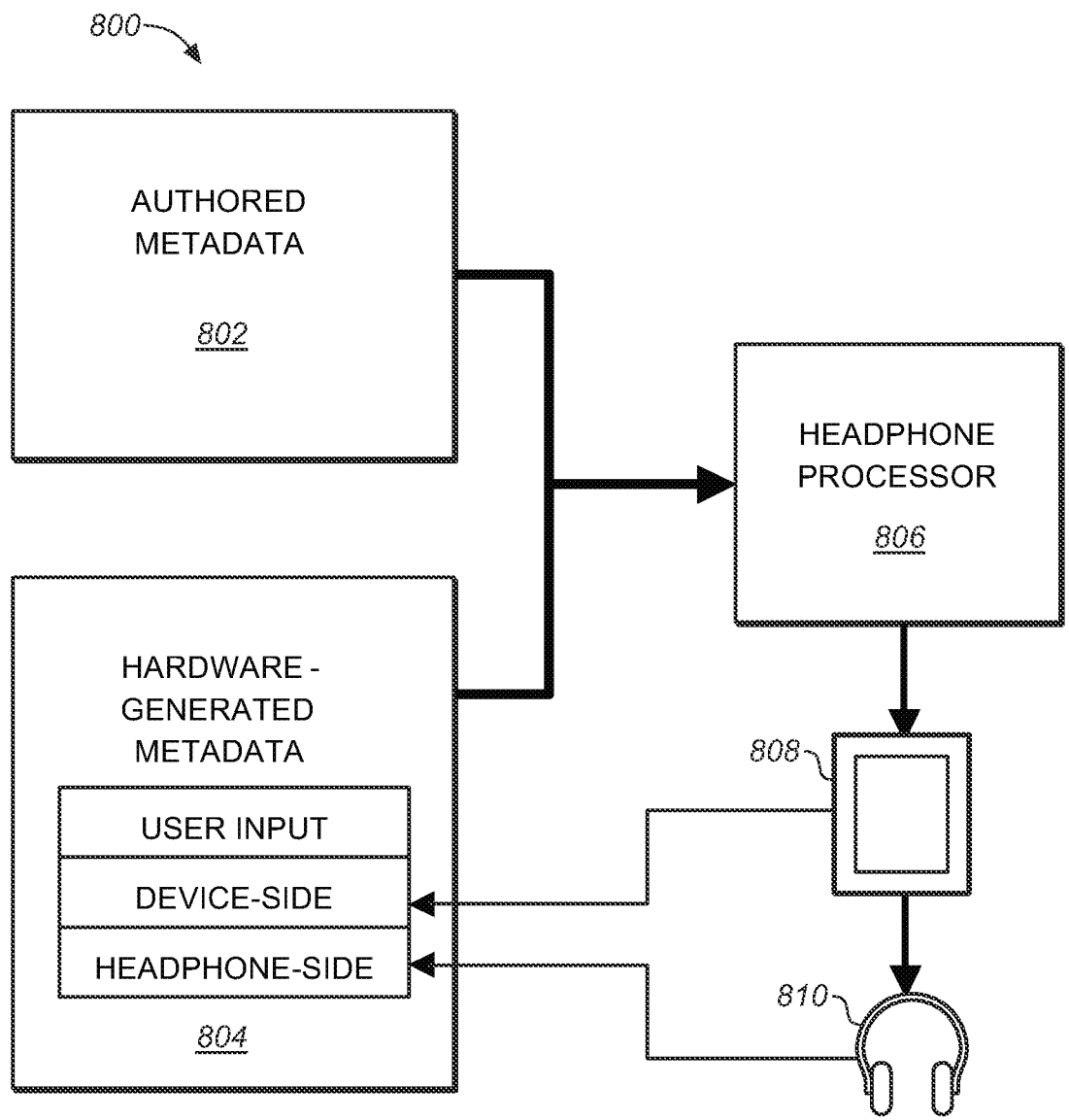
FIG. 8 is a block diagram illustrating the different metadata components that may be used in a headphone rendering system, under an embodiment.

FIG. 8 is a block diagram illustrating the different metadata components that may be used in a headphone rendering system, under an embodiment. As shown in diagram 800, the metadata processed by the headphone processor 806 comprises authored metadata, such as that produced by authoring tool 102 and mixing console 500, and hardware generated metadata 804. The hardware generated metadata 804 may include user input metadata, device-side metadata provided by or generated from data sent from device 808, and/or headphone-side metadata provided by or generated from data sent from headphone 810.

Figure 9:
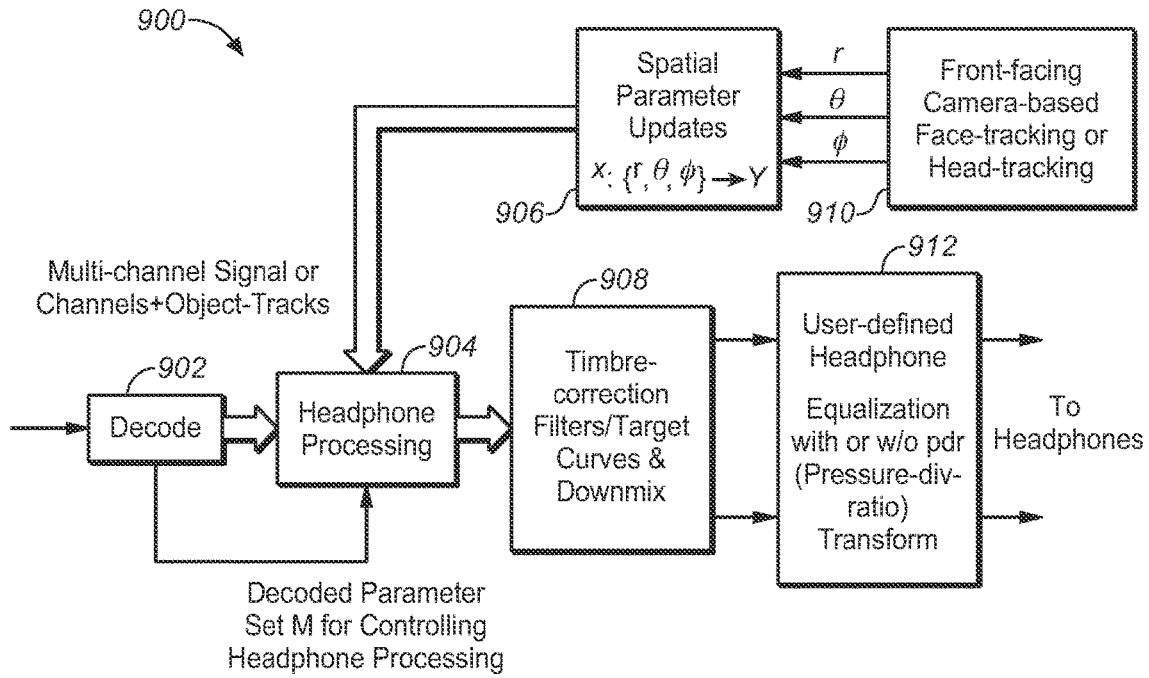
FIG. 9 illustrates functional components of a binaural rendering component for headphone processing, under an embodiment.

In an embodiment, the authored 802 and/or hardware-generated 804 metadata is processed in a binaural rendering component 114 of renderer 112. The metadata provides control over specific audio channels and/or objects to optimize playback over headphones 116 or 118. FIG. 9 illustrates functional components of a binaural rendering component for headphone processing, under an embodiment. As shown in system 900, decoder 902 outputs the multi-channel signal or the channel plus object tracks along with the decoded parameter set, M, for controlling the headphone processing performed by headphone processor 904. The headphone processor 904 also receives certain spatial parameter updates 906 from camera-based or sensor-based tracking device 910. Tracking device 910 is a face-tracking or head-tracking device that measures certain angular and positional parameters (r, θ, φ) associated with the user's head. The spatial parameters may correspond to distance and certain orientation angles, such as yaw, pitch, and roll. An original set of spatial parameters, x, may be updated as the sensor data 910 is processed. These spatial parameters updates Y are then passed to the headphone processor 904 for further modification of the parameter set M. The processed audio data is then transmitted to a post-processing stage 908 that performs certain audio processing such as timbre-correction, filtering, downmixing, and other relevant processes. The audio is then equalized by equalizer 912 and transmitted to the headphones. In an embodiment, the equalizer 912 may perform equalization with or without using a pressure-division-ratio (PDR) transform, as described in further detail in the description that follows.

Figure 10:
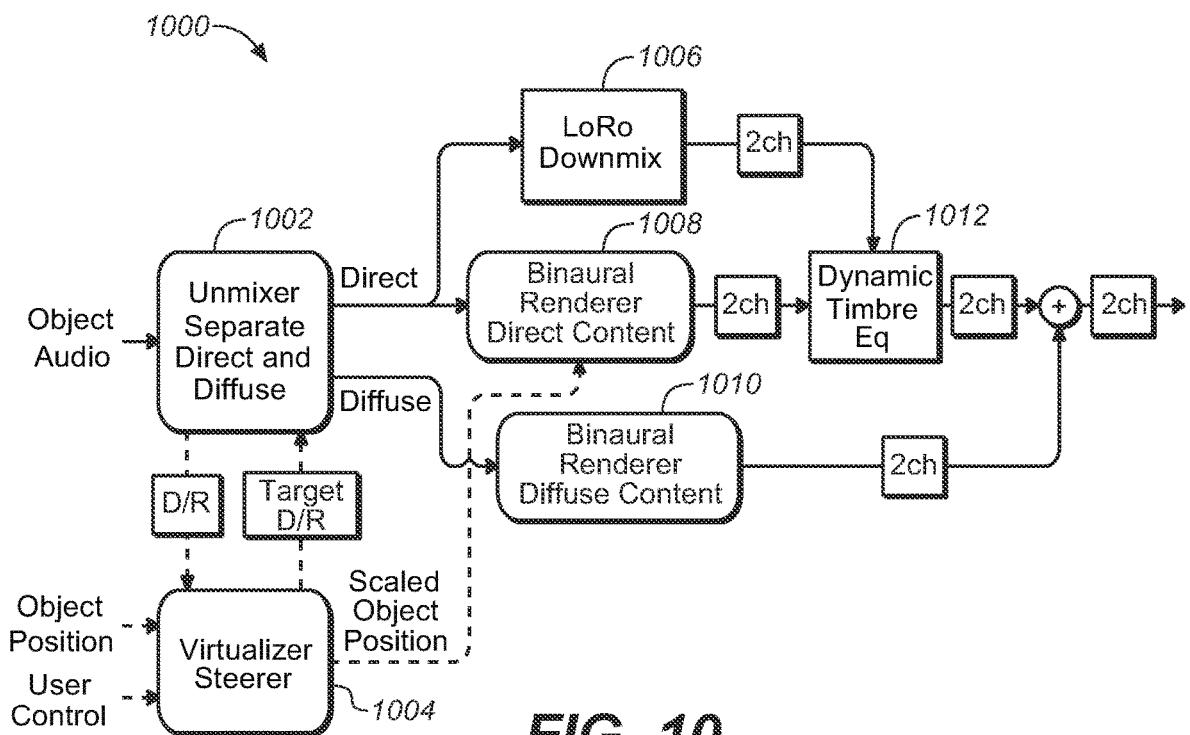
FIG. 10 illustrates a binaural rendering system for rendering audio objects in a headphone rendering system, under an embodiment.

FIG. 10 illustrates a binaural rendering system for rendering audio objects in a headphone rendering system, under an embodiment. FIG. 10 illustrates some of the signal components as they are processed through a binaural headphone processor. As shown in diagram 1000, object audio components are input to an unmixer 1002 that separates direct and diffuse components (e.g., direct from reverb path) of the audio. The direct component is input to a downmix component 1006 that downmixes surround channels (e.g., 5.1 surround) to stereo with phase shift information. The direct component is also input to a direct content binaural renderer 1008. Both two-channel components are then input to a dynamic timbre equalizer 1012. For the object based audio input, the object position and user control signals are input to a virtualizer steerer component 1004. This generates a scaled object position that is input to the binaural renderer 1008 along with the direct component. The diffuse component of the audio is input to a separate binaural renderer 1010, and is combined with the rendered direct content by an adder circuit prior to output as two-channel output audio.

Figure 11:
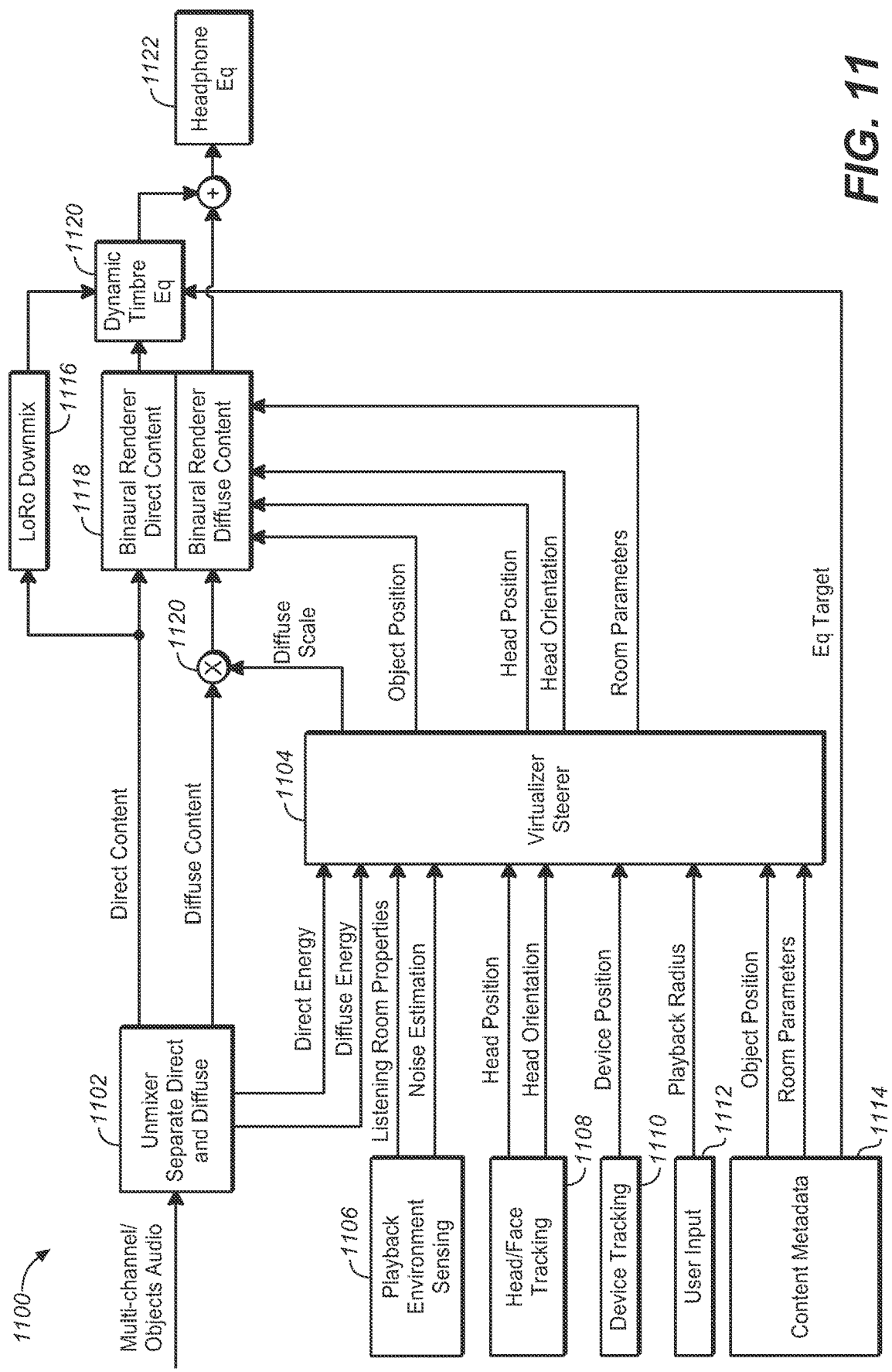
FIG. 11 illustrates a more detailed representation of the binaural rendering system of FIG. 10, under an embodiment.

FIG. 11 illustrates a more detailed representation of the binaural rendering system of FIG. 10, under an embodiment. As shown in diagram 1100 of FIG. 11, the multi-channel and object-based audio is input to unmixer 1102 for separation into direct and diffuse components. The direct content is processed by direct binaural renderer 1118, and the diffuse content is processed by diffuse binaural renderer 1120. After downmixing 1116 and timbre equalization 1124 of the direct content the diffuse and direct audio components are then combined through an adder circuit for post-processing, such as by headphone equalizer 1122, and other possible circuits. As shown in FIG. 11, certain user input and feedback data are used to modify the binaural rendering of the diffuse content in diffuse binaural renderer 1120. For the embodiment of system 1100, playback environment sensor 1106 provides data regarding listening room properties and noise estimation (ambient sound levels), head/face tracking sensor 1108 provides head position, orientation, and size data, device tracking sensor 1110 provides device position data, and user input 1112 provides playback radius data. This data may be provided by sensors located in the headphone 116 and/or device 104. The various sensor data and user input data is combined with content metadata, which provides object position and room parameter information in a virtualizer steerer component 1104. This component also receives direct and diffuse energy information from the unmixer 1102. The virtualizer steerer 1104 outputs data including object position, head position/orientation/size, room parameters, and other relevant information to the diffuse content binaural renderer 1120. In this manner, the diffuse content of the input audio is adjusted to accommodate sensor and user input data.

While optimal performance of the virtualizer steerer is achieved when sensor data, user input data, and content metadata are received, it is possible to achieve beneficial performance of the virtualizer steerer even in the absence of one or more of these inputs. For example, when processing legacy content (e.g., encoded bitstreams which do not contain binaural rendering metadata) for playback over conventional headphones (e.g., headphones which do not include various sensors, microphones, etc.), a beneficial result may still be obtained by providing the direct energy and diffuse energy outputs of the unmixer 1102 to the virtualizer steerer 1104 to generate control information for the diffuse content binaural renderer 1120, even in the absence of one or more other inputs to the virtualizer steerer.

In an embodiment, rendering system 1100 of FIG. 11 allows the binaural headphone renderer to efficiently provide individualization based on interaural time difference (ITD) and interaural level difference (ILD) and sensing of head size. ILD and ITD are important cues for azimuth, which is the angle of an audio signal relative to the head when produced in the horizontal plane. ITD is defined as the difference in arrival time of a sound between two ears, and the ILD effect uses differences in sound level entering the ears to provide localization cues. It is generally accepted that ITDs are used to localize low frequency sound and ILDs are used to localize high frequency sounds, while both are used for content that contains both high and low frequencies.

Rendering system 1100 also allows accommodation for source distance control and room model. It further allows for direct versus diffuse/reverb (dry/wet) content extraction and processing, optimization of room reflections, and timbral matching.

HRTF Model

Figure 12:
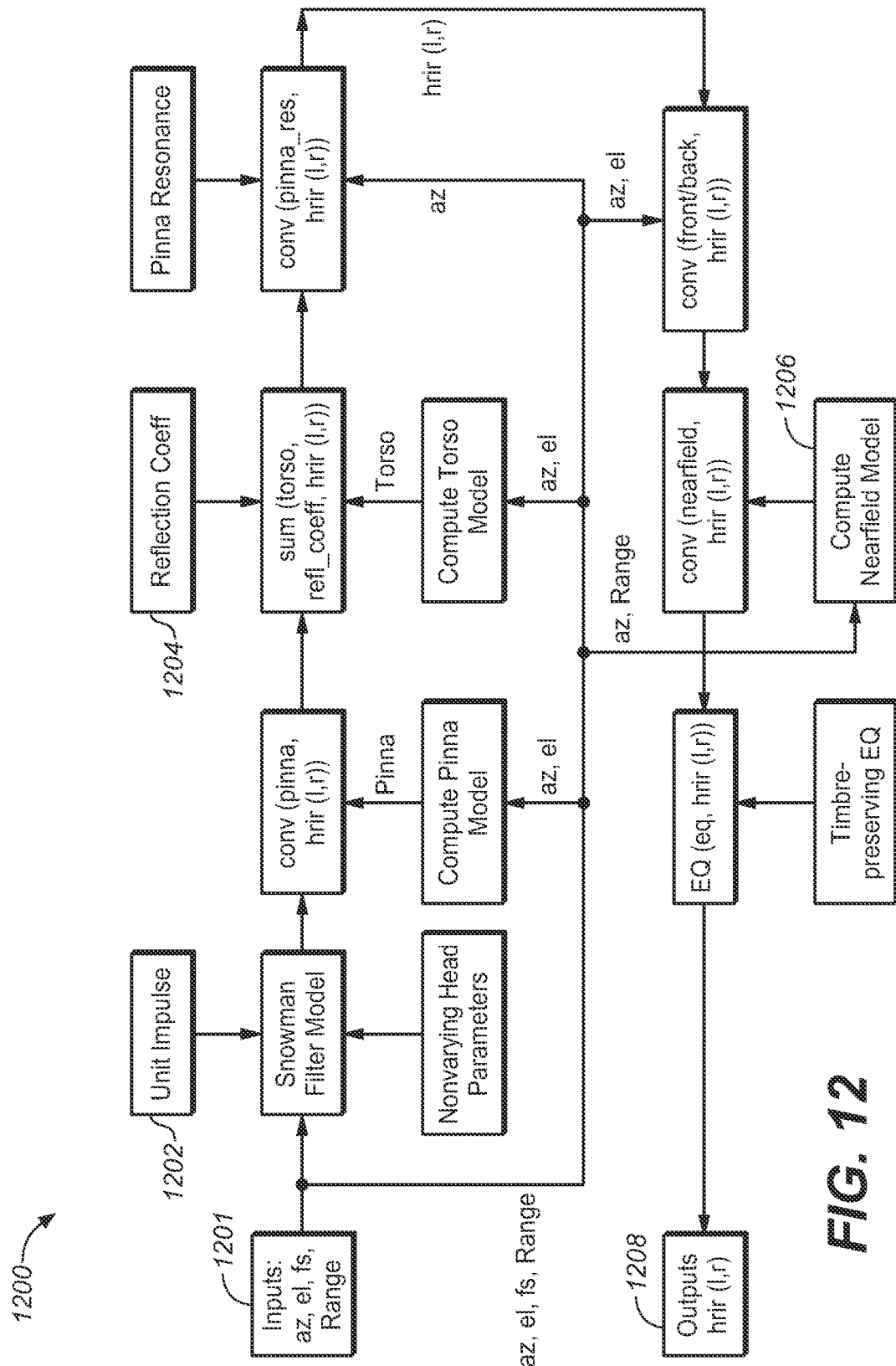
FIG. 12 is a system diagram showing the different tools used in an HRTF modeling system used in a headphone rendering system, under an embodiment.

In spatial audio reproduction, certain sound source cues are virtualized. For example, sounds intended to be heard from behind the listeners may be generated by speakers physically located behind them, and as such, all of the listeners perceive these sounds as coming from behind. With virtual spatial rendering over headphones, on the other hand, perception of audio from behind is controlled by head related transfer functions (HRTF) that are used to generate the binaural signal. In an embodiment, the metadata-based headphone processing system 100 may include certain HRTF modeling mechanisms. The foundation of such a system generally builds upon the structural model of the head and torso. This approach allows algorithms to be built upon the core model in a modular approach. In this algorithm, the modular algorithms are referred to as 'tools.' In addition to providing ITD and ILD cues, the model approach provides a point of reference with respect to the position of the ears on the head, and more broadly to the tools that are built upon the model. The system could be tuned or modified according to anthropometric features of the user. Other benefits of the modular approach allow for accentuating certain features in order to amplify specific spatial cues. For instance, certain cues could be exaggerated beyond what an acoustic binaural filter would impart to an individual. FIG. 12 is a system diagram showing the different tools used in an HRTF modeling system used in a headphone rendering system, under an embodiment. As shown in FIG. 12, certain inputs including azimuth, elevation, fs, and range are input to modeling stage 1204, after at least some input components are filtered 1202. In an embodiment, filter stage 1202 may comprise a snowman filter model that consists of a spherical head on top of a spherical body and accounts for the contributions of the torso as well as the head to the HRTF. Modeling stage 1204 computes the pinna and torso models and the left and right (1, r) components are post-processed 1206 for final output 1208.

Metadata Structure

Figure 13:
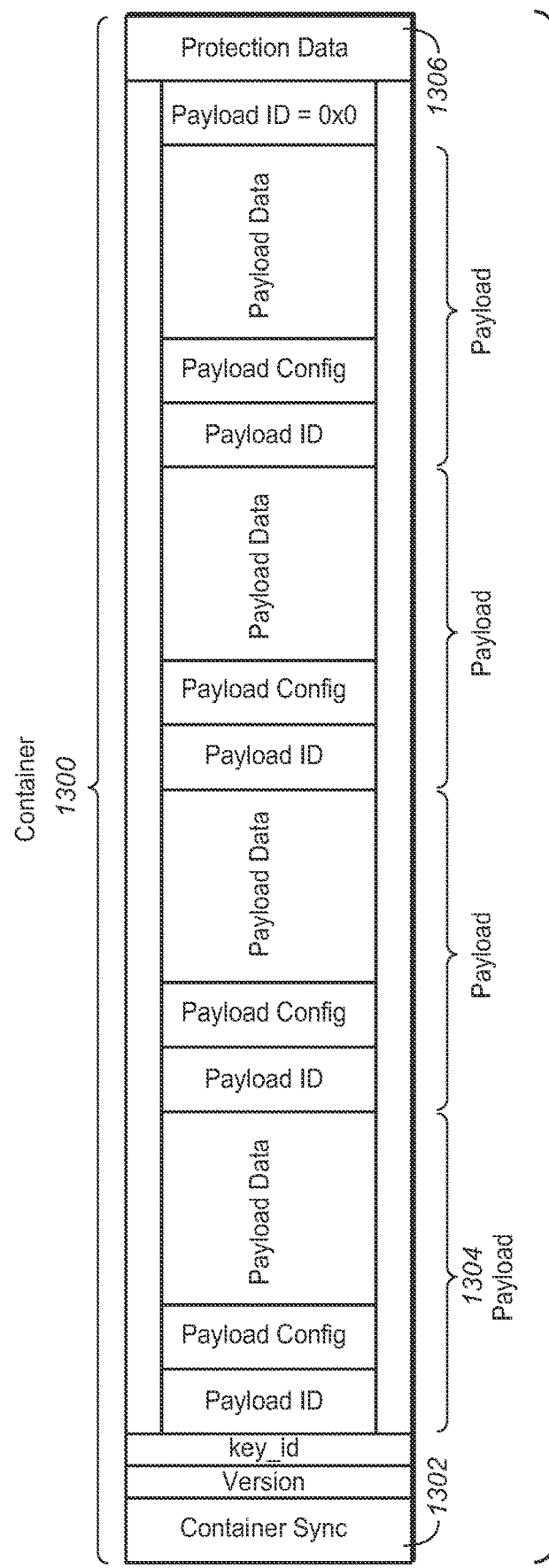
FIG. 13 illustrates a data structure that enables delivery of metadata for a headphone rendering system, under an embodiment.

As described above, the audio content processed by the headphone playback system comprises channels, objects and associated metadata that provides the spatial and processing cues necessary to optimize rendering of the audio through headphones. Such metadata can be generated as authored metadata from authoring tools as well as hardware generated metadata from one or more endpoint devices. FIG. 13 illustrates a data structure that enables delivery of metadata for a headphone rendering system, under an embodiment. In an embodiment, the metadata structure of FIG. 13 is configured to supplement the metadata delivered in other portions of a bitstream that may be packaged in accordance with a known channel-based audio format, such as Dolby digital AC-3 or Enhanced AC-3 bit stream syntax. As shown in FIG. 13, the data structure consists of a container 1300 that contains one or more data payloads 1304. Each payload is identified in the container using a unique payload identifier value to provide an unambiguous indication of the type of data present in the payload. The order of payloads within the container is undefined. Payloads can be stored in any order, and a parser must be able to parse the entire container to extract relevant payloads, and ignore payloads that are either not relevant or are unsupported. Protection data 1306 follows the final payload in the container that can be used by a decoding device to verify that the container and the payloads within the container are error-free. A preliminary portion 1302 containing sync, version, and key-ID information precedes the first payload in the container.

The data structure supports extensibility through the use of versioning and identifiers for specific payload types. The metadata payloads may be used to describe the nature or configuration of the audio program being delivered in an AC-3 or Enhanced AC-3 (or other type) bit stream, or may be used to control audio processing algorithms that are designed to further process the output of the decoding process.

Containers may be defined using different programming structures, based on implementation preferences. The table below illustrates example syntax of a container, under an embodiment.

```
container( )
{
  Version...............................................................  2
  if (version == 3)
  {
    version += variable_bits(2)...........................  variable_bits(2)
  }
  key_id...............................................................  3
  if (key_id == 7)
  {
    key_id += variable_bits(3)............................  variable_bits(3)
  }
  payload_id..........................................................  5
  while (payload_id != 0x0)
  {
    if (payload_id == 0x1F)
    {
      payload_id += variable_bits(5)....................  variable_bits(5)
    }
    payload_config( )
    payload_size..........................................  variable_bits(8)
    for (i = 0; i < payload_size; i++)
    {
      payload_bytes.....................................  8
    }
  }
  protection( )
}
```

An example of possible syntax of the variable bits for the example container syntax provided above is shown in the following table:

```
Syntax variable_bits (n_bits)
{
  value = 0;
  Do
  {
    value += read..................................................  n_bits
    read_more........................................................  1
    if (read_more)
    {
      value <<= n_bits;
      value += (1<<n_bits);
    }
  }
  while (read_more);
  return value;
}
```

An example of possible syntax of the payload configuration for the example container syntax provided above is shown in the following table:

| Syntax | No. of bits |
|---|---|
| payload_config( ) { | |
| Smploffste........................................................ | 1 |

-continued

| Syntax | No. of bits |
|---|---|
| if(smploffste) {smploffst} | 11 |
| Reserved | 1 |
| Duratione | 1 |
| if(duratione) {duration} | variable_bits(11) |
| Groupide | 1 |
| if (groupide) {groupid} | variable_bits(2) |
| Codecdatae | 1 |
| if (codecdatae) {reserved} | 8 |
| discard_unknown_payload | 1 |
| if(discard_unknown_payload == 0) | |
| { | |
|   if (smploffste == 0) | |
|   { | |
|     payload_frame_aligned | 1 |
|     if (payload_frame_aligned) | |
|     { | |
|       create_duplicate | 1 |
|       remove_duplicate | 1 |
|     } | |
|   } | |
|   if (smpoffste == 1 \|\| payload_frame_aligned == 1) | |
|   { | |
|     Priority | 5 |
|     proc_allowed | 2 |
|   } | |
| } | |
| } | |

The above syntax definitions are provided as example implementations, and are not meant to be limiting as many other different program structures may be used. In an embodiment, a number of fields within the container structure and payload data are encoded using a method known as variable-bits. This method enables efficient coding of small field values with extensibility to be able to express arbitrarily large field values. When variable_bit coding is used, the field is consists of one or more groups of n-bits, with each group followed by a 1-bit read_more field. At a minimum, coding of n bits requires n+1 bits to be transmitted. All fields coded using variable_bits are interpreted as unsigned integers. Various other different coding aspects may be implemented according to practices and methods known to those of ordinary skill in the art. The above tables and FIG. 13 illustrate an example metadata structure, format, and program content. It should be noted that these are intended to represent one example embodiment of a metadata representation, and other metadata definitions and content are also possible.

Headphone EQ and Correction

Figure 14:
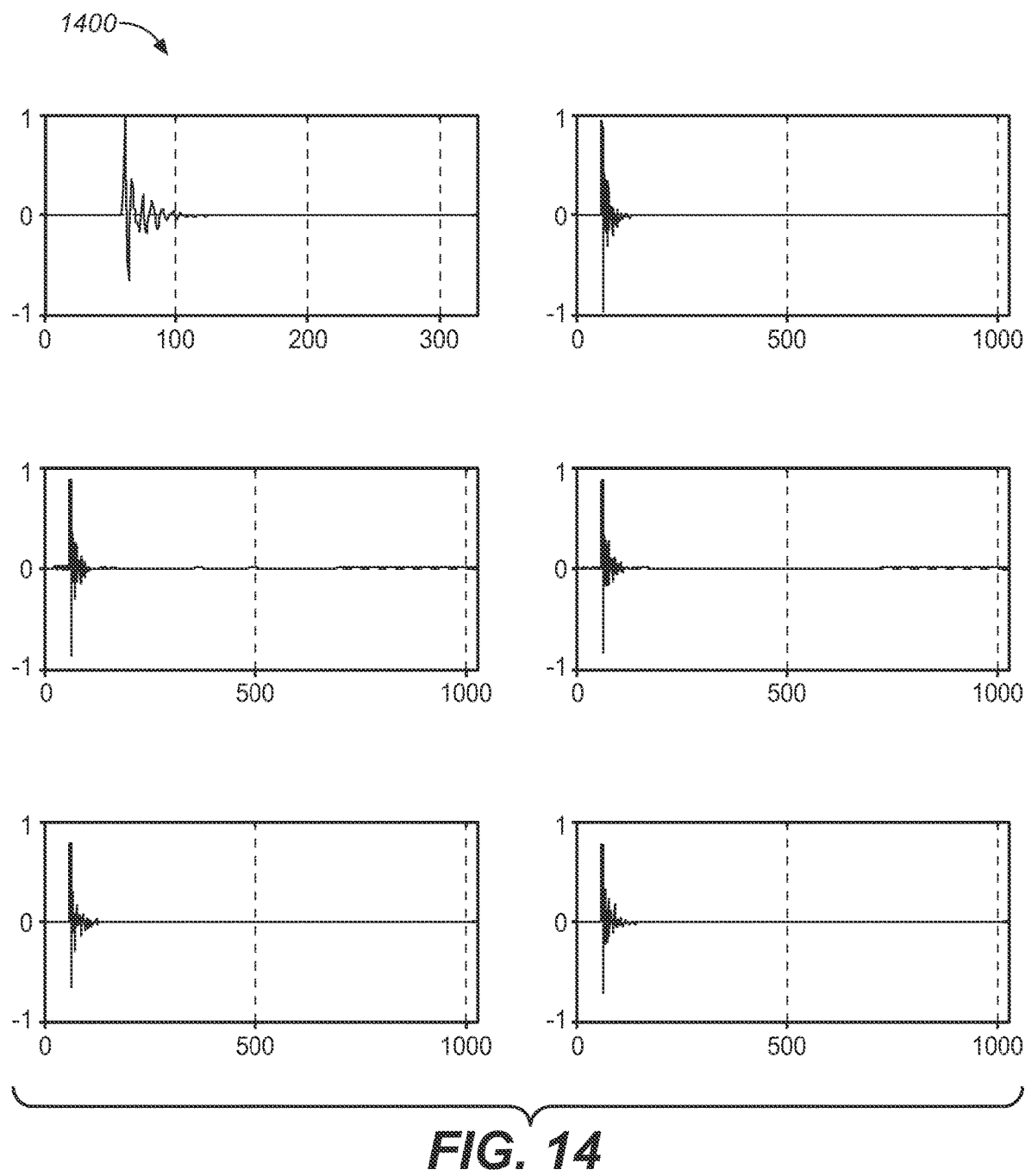
FIG. 14 illustrates an example case of three impulse response measurements for each ear, in an embodiment of a headphone equalization process.

As illustrated in FIG. 1, certain post-processing functions 115 may be performed by the renderer 112. One such post-processing function comprises headphone equalization, as shown in element 912 of FIG. 9. In an embodiment, equalization may be performed by obtaining blocked-ear canal impulse response measurements for different headphone placements for each ear. FIG. 14 illustrates an example case of three impulse response measurements for each ear, in an embodiment of a headphone equalization process. The equalization post-process compute the Fast Fourier Transform (FFT) of each response and performs an RMS (root-mean squared) averaging of the derived response. The responses may be variable, octave smoothed, ERB smoothed, etc. The process then computes the inversion, |F(ω)|, of the RMS average with constraints on the limits (+/−x dB) of the inversion magnitude response at mid- and high-frequencies. The process then determines the time-domain filter.

The post-process may also include a closed-to-open transform function. This pressure-division-ratio (PDR) method involves designing a transform to match the acoustical impedance between eardrum and free-field for closed-back headphones with modifications in terms of how the measurements are obtained for free-field sound transmission as a function of direction of arrival first-arriving sound. This indirectly enables matching the eardrum pressure signals between closed-back headphones and free-field equivalent conditions without requiring complicated eardrum measurements.

Figure 15A:
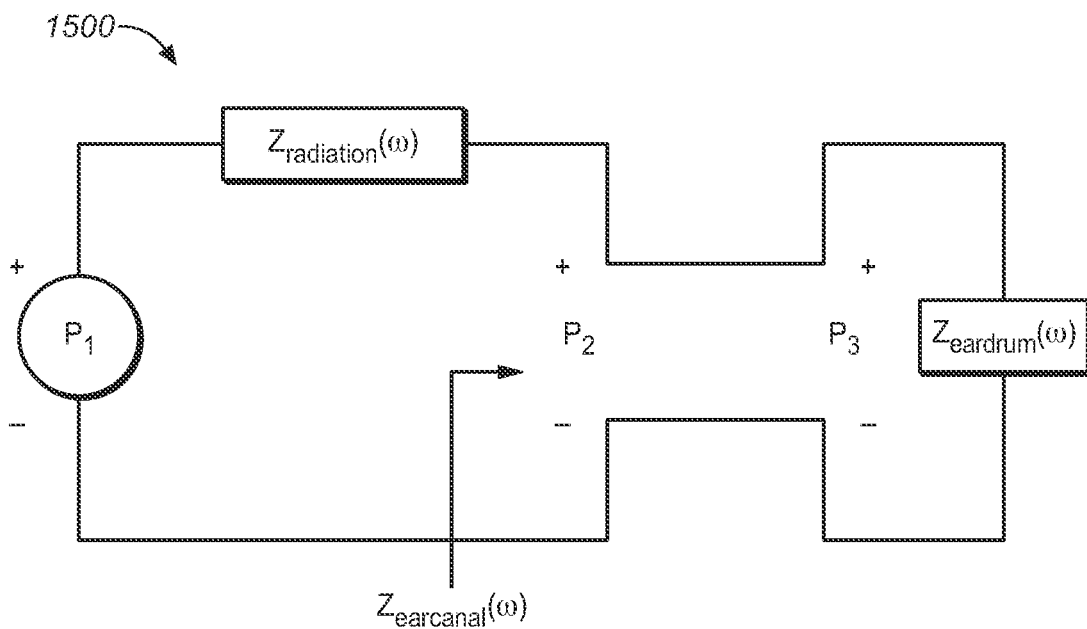
FIG. 15A illustrates a circuit for calculating the free-field sound transmission, under an embodiment.

FIG. 15A illustrates a circuit for calculating the free-field sound transmission, under an embodiment. Circuit 1500 is based on a free-field acoustical impedance model. In this model, $P_1(\omega)$ is the Thevenin pressure measured at the entrance of the blocked ear canal with a loudspeaker at 0 degrees about the median plane (e.g., about 30 degrees to the left and front of the listener) involving extraction of direct sound from the measured impulse response. Measurement $P_1(\omega)$ can be done at the entrance of the ear canal or at a certain distance inside (x mm) inside the ear canal (or at the eardrum) from the opening for the same loudspeaker at the same placement for measuring $P_1(\omega)$ involving extraction of direct sound from the measured impulse response.

For this model, the ratio of $P_2(\omega)/P_1(\omega)$ is calculated as follows:

$$\frac{P_2(\omega)}{P_1(\omega)} = \frac{Z_{eardrum}(\omega)}{Z_{eardrum}(\omega) + Z_{radiation}(\omega)}$$

Figure 15B:
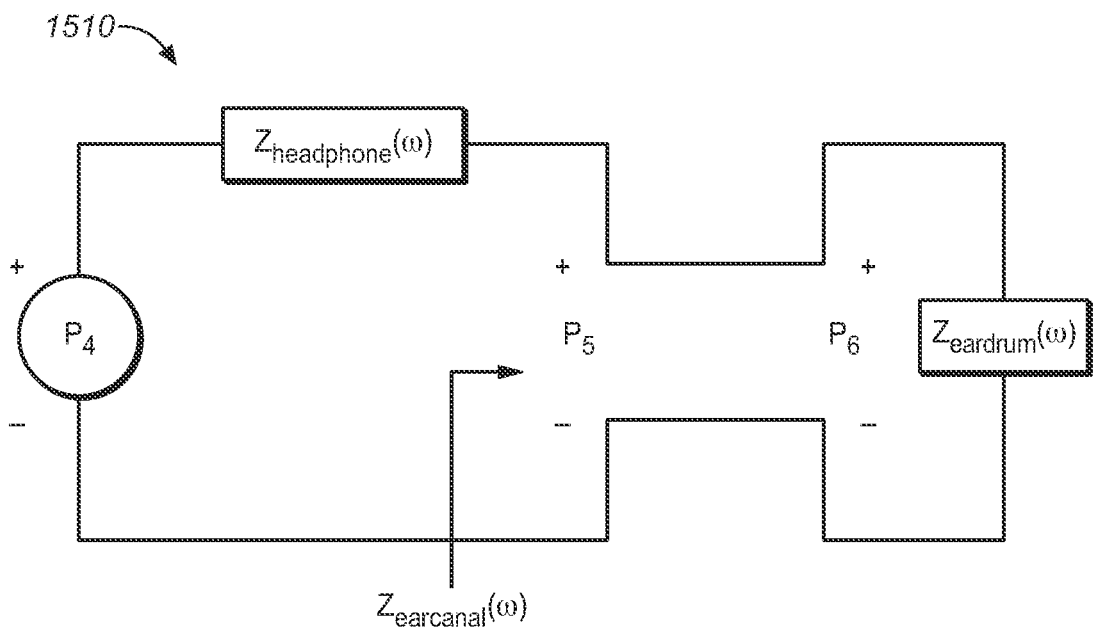
FIG. 15B illustrates a circuit for calculating the headphone sound transmission, under an embodiment.

FIG. 15B illustrates a circuit for calculating the headphone sound transmission, under an embodiment. Circuit 1510 is based on a headphone acoustical impedance analog model. In this model, $P_4$ is measured at the entrance of the blocked ear canal with headphone (RMS averaged) steady-state measurement, and measure $P_5(\omega)$ is made at the entrance to the ear canal or at a distance inside the ear canal (or at the eardrum) from the opening for the same headphone placement used for measuring $P_4(\omega)$).

For this model, the ratio of $P_5(\omega)/P_4(\omega)$ is calculated as follows:

$$\frac{P_5(\omega)}{P_4(\omega)} = \frac{Z_{eardrum}(\omega)}{Z_{eardrum}(\omega) + Z_{headphone}(\omega)}$$

The pressure-division-ratio (PDR) can then be calculated using the following formula:

$$PDR(\omega) = \frac{P_2(\omega)}{P_1(\omega)} \div \frac{P_5(\omega)}{P_4(\omega)}$$

Aspects of the methods and systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof. In an embodiment in which the network comprises the Internet, one or more machines may be configured to access the Internet through web browser programs.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, performed by an audio signal processing device, for generating a binaural rendering of digital audio content for playback through headphones, the method comprising:
   receiving an encoded signal comprising the digital audio content and rendering metadata, wherein the digital audio content comprises a plurality of audio object signals and channel audio signals;
   receiving playback control metadata comprising room model metadata;
   decoding the encoded signal to obtain the plurality of audio object signals and channel audio signals; and
   generating the binaural rendering of the digital audio content in response to the plurality of audio object signals and channel audio signals, the rendering metadata, and the playback control metadata;
   wherein the rendering metadata indicates, for each audio object signal, position and gain, and, for each channel audio signal, a position of the channel audio signal, and whether to use stereo instead of binaural rendering for the channel audio signal;
   wherein, when the rendering metadata indicates, for a channel audio signal, to use stereo rendering for the channel audio signal, generating the binaural rendering of the digital audio content comprises, for the channel audio signal, generating a stereo rendering of the channel audio signal; and
   wherein, when the rendering metadata indicates, for a channel audio signal, to use binaural rendering for the channel audio signal, generating the binaural rendering of the digital audio content comprises, for the channel audio signal, generating a binaural rendering of the channel audio signal.

2. An audio signal processing device for generating a binaural rendering of digital audio content for playback through headphones, the audio signal processing device comprising one or more processors to:
   receive an encoded signal comprising the digital audio content and rendering metadata, wherein the digital audio content comprises a plurality of audio object signals and channel audio signals;
   receive playback control metadata comprising room model metadata;
   decode the encoded signal to obtain the plurality of audio object signals and channel audio signals; and
   generate the binaural rendering of the digital audio content in response to the plurality of audio object signals and channel audio signals, the rendering metadata, and the playback control metadata;
   wherein the rendering metadata indicates, for each audio object signal, position and gain, and, for each channel audio signal, a position of the channel audio signal, and whether to use stereo instead of binaural rendering for the channel audio signal;
   wherein, when the rendering metadata indicates, for a channel audio signal, to use stereo rendering for the channel audio signal, generating the binaural rendering of the digital audio content comprises, for the channel audio signal, generating a stereo rendering of the channel audio signal; and
   wherein, when the rendering metadata indicates, for a channel audio signal, to use binaural rendering for the channel audio signal, generating the binaural rendering of the digital audio content comprises, for the channel audio signal, generating a binaural rendering of the channel audio signal.

3. A non-transitory computer readable storage medium comprising a sequence of instructions, which, when executed by an audio signal processing device, cause the audio signal processing device to perform a method for generating a binaural rendering of digital audio content for playback through headphones, the method comprising:
 receiving an encoded signal comprising the digital audio content and rendering metadata, wherein the digital audio content comprises a plurality of audio object signals and channel audio signals;
 receiving playback control metadata comprising room model metadata;
 decoding the encoded signal to obtain the plurality of audio object signals and channel audio signals; and
 generating the binaural rendering of the digital audio content in response to the plurality of audio object signals and channel audio signals, the rendering metadata, and the playback control metadata;
 wherein the rendering metadata indicates, for each audio object signal, position and gain, and, for each channel audio signal, a position of the channel audio signal, and whether to use stereo instead of binaural rendering for the channel audio signal;
 wherein, when the rendering metadata indicates, for a channel audio signal, to use stereo rendering for the channel audio signal, generating the binaural rendering of the digital audio content comprises, for the channel audio signal, generating a stereo rendering of the channel audio signal; and
 wherein, when the rendering metadata indicates, for a channel audio signal, to use binaural rendering for the channel audio signal, generating the binaural rendering of the digital audio content comprises, for the channel audio signal, generating a binaural rendering of the channel audio signal.

* * * * *